United States Patent
Yang

(10) Patent No.: US 9,999,001 B2
(45) Date of Patent: Jun. 12, 2018

(54) POWER CONTROL METHOD AND DEVICE

(71) Applicant: Huawei Technologies Co., Ltd., Shenzhen (CN)

(72) Inventor: Changqing Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days. days.

(21) Appl. No.: 15/662,825

(22) Filed: Jul. 28, 2017

(65) Prior Publication Data
US 2017/0347324 A1   Nov. 30, 2017

Related U.S. Application Data

(63) Continuation of application No. PCT/CN2015/071979, filed on Jan. 30, 2015.

(51) Int. Cl.
*H04B 7/00* (2006.01)
*H04W 52/24* (2009.01)
(Continued)

(52) U.S. Cl.
CPC ....... *H04W 52/247* (2013.01); *H04W 52/245* (2013.01); *H04W 52/36* (2013.01); *H04W 72/042* (2013.01)

(58) Field of Classification Search
CPC . H04W 52/247; H04W 52/245; H04W 52/36; H04W 72/042
See application file for complete search history.

(56) References Cited

U.S. PATENT DOCUMENTS 5,459,456 A * 10/1995 Hosack ................. H04L 1/0045
340/7.44
7,623,866 B1 * 11/2009 Spitzer .............. H04W 36/0061
455/437
(Continued)

FOREIGN PATENT DOCUMENTS

CN   102858012 A   1/2013
CN   103139889 A   6/2013
(Continued)

OTHER PUBLICATIONS

Chong Yin, et al., "Device-to-Device Assisted Two-stage Cooperative Multicast with Optimal Resource Utilization," 2014, IEEE Globecom Workshop—Emerging Technologies for 5G Wireless Cellular Networks, Dec. 8, 2014, XP032747942, pp. 839-844.
(Continued)

*Primary Examiner* — Dominic Rego
(74) *Attorney, Agent, or Firm* — Slater Matsil, LLP

(57) ABSTRACT

A power control method and a device are provided. A network device generates, according to a coverage ratio of actual coverage performance between a second user direct connection communication device and a first user direct connection communication device to expected coverage performance of the first user direct connection communication device, a power adjustment indication message, and sends the power adjustment indication message to the first user direct connection communication device; and the first user direct connection communication device controls transmit power according to the power adjustment indication message.

20 Claims, 9 Drawing Sheets

(51) Int. Cl.
   *H04W 72/04*   (2009.01)
   *H04W 52/36*   (2009.01)

(56) References Cited

U.S. PATENT DOCUMENTS

| | | | |
|---|---|---|---|
| 8,150,344 B1* | 4/2012 | Goyal | H04W 24/02 |
| | | | 455/130 |
| 9,794,943 B1* | 10/2017 | Oroskar | H04W 72/048 |
| 2010/0331000 A1* | 12/2010 | Zhu | H04W 36/245 |
| | | | 455/444 |
| 2013/0083831 A1 | 4/2013 | Alex et al. | |
| 2013/0115943 A1* | 5/2013 | Bao | H04W 48/16 |
| | | | 455/434 |
| 2014/0269491 A1* | 9/2014 | Edge | H04W 48/16 |
| | | | 370/328 |
| 2014/0274196 A1 | 9/2014 | Dai et al. | |

FOREIGN PATENT DOCUMENTS

| | | |
|---|---|---|
| CN | 103260232 A | 8/2013 |
| CN | 104113832 A | 10/2014 |
| CN | 104202821 A | 12/2014 |
| WO | 2013078946 A1 | 6/2013 |

OTHER PUBLICATIONS

IEEE Std 802.11p™—2010, IEEE Standard for Information technology—Telecommunications and information exchange between systems—Local and metropolitan area networks—Specific requirements; Part 11:Wireless LAN Medium Access Control (MAC) and Physical Layer (PHY) Specifications; Amendment 6:Wireless Access in Vehicular Environments, 51 pages.

IEEE Std 1609.4™—2010/Cor 1—2014,IEEE Standard for Wireless Access in Vehicular Environments (WAVE)—Multi-channel Operation; Corrigendum 1: Miscellaneous Corrections, 30 pages.

IEEE Std 1609.4™ 2010, IEEE Standard for Wireless Access in Vehicular Environments (WAVE)—Multi-channel Operation, 89 pages.

* cited by examiner

POWER CONTROL METHOD AND DEVICE

CROSS-REFERENCE TO RELATED APPLICATIONS

This application is a continuation of International Application No. PCT/CN2015/071979, filed on Jan. 30, 2015, the disclosure of which is hereby incorporated by reference in its entirety.

TECHNICAL FIELD

The present invention relates to the field of communications technologies, and in particular, to a power control method and a device.

BACKGROUND

Device-to-device (D2D) communication, also referred to as user direct connection communication, means that data can be directly transmitted between devices without an aid of a third party. In D2D transmission, transmit power of a transmitting device directly affects a receive signal level of a receiving device, and further affects performance of a link between the transmitting device and the receiving device. In particular, in dedicated short range communications (DSRC) or an intelligent transport system (ITS), transmit power of a vehicle, which is a special D2D device, also directly affects a coverage area of a safety message, and affects safety of a nearby vehicle.

Therefore, how to enable a transmitting D2D device to appropriately set its transmit power to make actual coverage performance of the transmitting D2D device match expected coverage performance is a problem to be resolved at present.

SUMMARY

Embodiments of the present invention provide a power control method and a device, so that a transmitting D2D device can appropriately set its transmit power, to make actual coverage performance of the transmitting D2D device match expected coverage performance.

According to a first aspect, a power control method is provided. The method includes sending, by a first user direct connection communication D2D device, a first message to a second D2D device at a first transmit power, where the first message carries expected coverage performance of the first D2D device, so that the second D2D device sends a second message to a network device according to the first message and actual coverage performance of the first D2D device relative to the second D2D device, where the second message carries a coverage ratio of the actual coverage performance to the expected coverage performance, so that the network device generates a power adjustment indication message according to the coverage ratio and sends the power adjustment indication message to the first D2D device. The method also includes receiving, by the first D2D device, the power adjustment indication message sent by the network device. The method also includes adjusting, by the first D2D device, a transmit power of the first message to be a second transmit power according to the power adjustment indication message.

In a first possible implementation, if the expected coverage performance is an expected coverage distance, the first message further includes location information of the first D2D device.

With reference to the first aspect or the first possible implementation of the first aspect, in a second possible implementation, the first message and the second message further include an identifier of the first D2D device.

With reference to the first aspect, the first possible implementation of the first aspect, or the second possible implementation of the first aspect, in a third possible implementation, the second message is sent by the second D2D device to the network device on a time-frequency resource indicated to the second D2D device by the network device.

With reference to the first aspect, the first possible implementation of the first aspect, the second possible implementation of the first aspect, or the third possible implementation of the first aspect, in a fourth possible implementation, the first D2D device broadcasts the first message to multiple second D2D devices, and the second message is sent by the second D2D device to the network device on a time-frequency resource obtained through contention in a feedback resource pool of the network device, where the second D2D device first obtains through contention the time-frequency resource among the multiple second D2D devices contending for a time-frequency resource in the feedback resource pool.

With reference to the first aspect, the first possible implementation of the first aspect, the second possible implementation of the first aspect, the third possible implementation of the first aspect, or the fourth possible implementation of the first aspect, in a fifth possible implementation, before the sending, by a first D2D device, a first message to a second D2D device at a first transmit power, the method further includes: receiving, by the first D2D device, a time-frequency resource indication message indicated to the first D2D device by the network device, where the time-frequency resource indication message includes information about a location of a time-frequency resource; and the sending, by a first D2D device, a first message to a second D2D device at a first transmit power includes: sending, by the first D2D device, the first message to the second D2D device at the first transmit power on a time-frequency resource corresponding to the location of the time-frequency resource.

With reference to the first aspect, the first possible implementation of the first aspect, the second possible implementation of the first aspect, the third possible implementation of the first aspect, the fourth possible implementation of the first aspect, or the fifth possible implementation of the first aspect, in a sixth possible implementation, the power adjustment indication message includes information indicating a transmit power adjustment step; and the adjusting, by the first D2D device, a transmit power of the first message to be a second transmit power according to the power adjustment indication message includes: obtaining, by the first D2D device, the second transmit power according to the power adjustment indication message, and sending the first message at the second transmit power, where the second transmit power is a smaller power value between a maximum rated transmit power of the first D2D device and a sum of the first transmit power and the transmit power adjustment step.

With reference to the first aspect, the first possible implementation of the first aspect, the second possible implementation of the first aspect, the third possible implementation of the first aspect, the fourth possible implementation of the first aspect, the fifth possible implementation of the first aspect, or the sixth possible implementation of the first aspect, in a seventh possible implementation, the information indicating the transmit power adjustment step is specifically an N-bit field, where N is a positive integer, and the N-bit field is used to indicate a maximum of $2^N$ transmit power adjustment steps.

With reference to the first aspect, the first possible implementation of the first aspect, the second possible implementation of the first aspect, the third possible implementation of the first aspect, the fourth possible implementation of the first aspect, the fifth possible implementation of the first aspect, the sixth possible implementation of the first aspect, or the seventh possible implementation of the first aspect, in an eighth possible implementation, the actual coverage performance includes any one of an actual coverage distance, an actual receive level, or an actual receive signal to interference plus noise ratio; and the expected coverage performance includes any one of an expected coverage distance, an expected receive level, or an expected receive signal to interference plus noise ratio.

According to a second aspect, a power control method is provided. The method includes receiving, by a second user direct connection communication D2D device, a first message sent by a first D2D device at a first transmit power, where the first message carries expected coverage performance of the first D2D device. The method also includes obtaining, by the second D2D device, actual coverage performance of the first D2D device relative to the second D2D device. The method also includes sending, by the second D2D device, a second message to a network device, where the second message carries a coverage ratio of the actual coverage performance to the expected coverage performance, so that the network device generates a power adjustment indication message according to the coverage ratio and sends the power adjustment indication message to the first D2D device.

In a first possible implementation, if the expected coverage performance is an expected coverage distance, the first message further includes location information of the first D2D device.

With reference to the second aspect or the first possible implementation of the second aspect, in a second possible implementation, the first message and the second message further include an identifier of the first D2D device.

With reference to the second aspect, the first possible implementation of the second aspect, or the second possible implementation of the second aspect, in a third possible implementation, before the sending, by the second D2D device, a second message to a network device, the method further includes: obtaining, by the second D2D device, a time-frequency resource indication message sent by the network device, where the time-frequency resource indication message includes information about a location of a time-frequency resource on which the second message is sent; and the sending, by the second D2D device, a second message to a network device includes: sending, by the second D2D device, the second message to the network device on a time-frequency resource corresponding to the location of the time-frequency resource.

With reference to the second aspect, the first possible implementation of the second aspect, the second possible implementation of the second aspect, or the third possible implementation of the second aspect, in a fourth possible implementation, another D2D device also receives the first message sent by the first D2D device, the information about the location of the time-frequency resource on which the second message is sent is information about a location of at least one time-frequency resource on which the second message is sent, and the location of the time-frequency resource on which the second message is sent constitutes a feedback resource pool; the method further includes: contending, by the second D2D device, with the another D2D device for the location of the time-frequency resource in the feedback resource pool; and the sending, by the second D2D device, a second message to a network device includes: sending, by the second D2D device, the second message to the network device on a time-frequency resource corresponding to the location of the time-frequency resource obtained through contention.

With reference to the second aspect, the first possible implementation of the second aspect, the second possible implementation of the second aspect, the third possible implementation of the second aspect, or the fourth possible implementation of the second aspect, in a fifth possible implementation, the contending, by the second D2D device, with the another D2D device for the location of the time-frequency resource in the feedback resource pool includes: setting, by the second D2D device, a timer for contending for the location of the time-frequency resource in the feedback resource pool, where a timing value of the timer is a value of a monotonically decreasing function in which an independent variable represents the coverage ratio; starting, by the second D2D device, timing simultaneously with the another D2D device, and contending for the location of the time-frequency resource in the feedback resource pool, where the another D2D device also sets the timer; and when the timer set by the second D2D device first expires, obtaining, by the second D2D device through contention, the time-frequency resource in the feedback resource pool.

According to a third aspect, a power control method is provided. The method includes receiving, by a network device, a second message sent by a second user direct connection communication D2D device, where the second message carries a coverage ratio of actual coverage performance to expected coverage performance of a first D2D device, the actual coverage performance is actual coverage performance of the first D2D device relative to the second D2D device, and the expected coverage performance is carried in a first message sent by the first D2D device to the second D2D device at a first transmit power. The method also includes generating, by the network device, a power adjustment indication message according to the coverage ratio. The method also includes sending, by the network device, the power adjustment indication message to the first D2D device, so that the first D2D device adjusts a transmit power of the first message to be a second transmit power according to the power adjustment indication message.

In a first possible implementation, if the expected coverage performance is an expected coverage distance, the first message further includes location information of the first D2D device.

With reference to the third aspect or the first possible implementation of the third aspect, in a second possible implementation, the first message and the second message further include an identifier of the first D2D device.

With reference to the third aspect, the first possible implementation of the third aspect, or the second possible implementation of the third aspect, in a third possible implementation, before the receiving, by a network device, a second message sent by the second D2D device, the method further includes: sending, by the network device, a time-frequency resource indication message to the second D2D device, where the time-frequency resource indication message includes information about a location of a time-frequency resource, so that the second D2D device sends the second message to the network device on a time-frequency resource corresponding to the location of the time-frequency resource.

With reference to the third aspect, the first possible implementation of the third aspect, the second possible implementation of the third aspect, or the third possible implementation of the third aspect, in a fourth possible implementation, the first D2D device broadcasts the first message to multiple second D2D devices, and the method further includes: setting, by the network device, a feedback resource pool for the multiple second D2D devices, where the feedback resource pool includes a location of at least one time-frequency resource on which the second message is sent; and the receiving, by a network device, a second message sent by a second D2D device includes: receiving, by the network device, a second message sent on a time-frequency resource corresponding to a location of a time-frequency resource by a second D2D device that obtains through contention the location of the time-frequency resource in the feedback resource pool among the multiple second D2D devices.

With reference to the third aspect, the first possible implementation of the third aspect, the second possible implementation of the third aspect, the third possible implementation of the third aspect, or the fourth possible implementation of the third aspect, in a fifth possible implementation, the power adjustment indication message includes information indicating a transmit power adjustment step, and the information indicating the transmit power adjustment step is an N-bit field, where N is a positive integer, and the N-bit field is used to indicate a maximum of $2^N$ transmit power adjustment steps.

According to a fourth aspect, a power control method is provided. The method includes sending, by a first user direct connection communication D2D device, a first message to a second D2D device at a first transmit power, where the first message carries information about expected coverage performance, so that the second D2D device sends a second message to the first D2D device according to the first message and actual coverage performance of the first D2D device relative to the second D2D device, and the second message carries a coverage ratio of the actual coverage performance to the expected coverage performance. The method also includes receiving, by the first D2D device, the second message sent by the second D2D device. The method also includes adjusting, by the first D2D device, a transmit power of the first message to be a second transmit power according to the coverage ratio.

In a first possible implementation, if the expected coverage performance is an expected coverage distance, the first message further includes location information of the first D2D device.

With reference to the fourth aspect or the first possible implementation of the fourth aspect, in a second possible implementation, the first message and the second message further include an identifier of the first D2D device.

With reference to the fourth aspect, the first possible implementation of the fourth aspect, or the second possible implementation of the fourth aspect, in a third possible implementation, the second message is sent by the second D2D device to the first D2D device on a time-frequency resource indicated to the second D2D device by the network device.

With reference to the fourth aspect, the first possible implementation of the fourth aspect, the second possible implementation of the fourth aspect, or the third possible implementation of the fourth aspect, in a fourth possible implementation, the first D2D device broadcasts the first message to multiple second D2D devices, and the second message is sent by the second D2D device to the network device on a time-frequency resource obtained through contention in a feedback resource pool of the network device, where the second D2D device first obtains through contention the time-frequency resource among the multiple second D2D devices contending for a time-frequency resource in the feedback resource pool.

With reference to the fourth aspect, the first possible implementation of the fourth aspect, the second possible implementation of the fourth aspect, the third possible implementation of the fourth aspect, or the fourth possible implementation of the fourth aspect, in a fifth possible implementation, before the sending, by a first D2D device, a first message to a second D2D device at a first transmit power, the method further includes: receiving, by the first D2D device, a time-frequency resource indication message indicated to the first D2D device by the network device, where the time-frequency resource indication message includes information about a location of a time-frequency resource; and the sending, by a first D2D device, a first message to a second D2D device at a first transmit power includes: sending, by the first D2D device, the first message to the second D2D device at the first transmit power on a time-frequency resource corresponding to the location of the time-frequency resource.

With reference to the fourth aspect, the first possible implementation of the fourth aspect, the second possible implementation of the fourth aspect, the third possible implementation of the fourth aspect, the fourth possible implementation of the fourth aspect, or the fifth possible implementation of the fourth aspect, in a sixth possible implementation, the adjusting, by the first D2D device, a transmit power of the first message to be a second transmit power according to the coverage ratio includes: determining, by the first D2D device, a transmit power adjustment step according to the coverage ratio; and obtaining, by the first D2D device, the second transmit power according to the transmit power adjustment step, and sending the first message at the second transmit power, where the second transmit power is a smaller power value between a maximum rated transmit power of the first D2D device and a sum of the first transmit power and the transmit power adjustment step.

With reference to the fourth aspect, the first possible implementation of the fourth aspect, the second possible implementation of the fourth aspect, the third possible implementation of the fourth aspect, the fourth possible implementation of the fourth aspect, the fifth possible implementation of the fourth aspect, or the sixth possible implementation of the fourth aspect, in a seventh possible implementation, the actual coverage performance includes any one of an actual coverage distance, an actual receive level, or an actual receive signal to interference plus noise ratio; and the expected coverage performance includes any one of an expected coverage distance, an expected receive level, or an expected receive signal to interference plus noise ratio.

According to a fifth aspect, a power control method is provided. The method includes receiving, by a second user direct connection communication D2D device, a first message sent by a first D2D device at a first transmit power, where the first message carries information about expected coverage performance of the first D2D device. The method also includes obtaining, by the second D2D device, actual coverage performance of the first D2D device relative to the second D2D device. The method also includes sending, by the second D2D device, a second message to the first D2D device, where the second message carries a coverage ratio of the actual coverage performance to the expected coverage performance.

In a first possible implementation, if the expected coverage performance is an expected coverage distance, the first message further includes location information of the first D2D device.

With reference to the fifth aspect or the first possible implementation of the fifth aspect, in a second possible implementation, the first message and the second message further include an identifier of the first D2D device.

With reference to the fifth aspect, the first possible implementation of the fifth aspect, or the second possible implementation of the fifth aspect, in a third possible implementation, before the sending, by the second D2D device, a second message to the first D2D device, the method further includes: obtaining, by the second D2D device, a time-frequency resource indication message sent by a network device, where the time-frequency resource indication message includes information about a location of a time-frequency resource on which the second message is sent; and the sending, by the second D2D device, a second message to the first D2D device includes: sending, by the second D2D device, the second message to the first D2D device on a time-frequency resource corresponding to the location of the time-frequency resource.

With reference to the fifth aspect, the first possible implementation of the fifth aspect, the second possible implementation of the fifth aspect, or the third possible implementation of the fifth aspect, in a fourth possible implementation, another D2D device also receives the first message sent by the first D2D device, the information about the location of the time-frequency resource on which the second message is sent is information about a location of at least one time-frequency resource on which the second message is sent, and the location of the time-frequency resource on which the second message is sent constitutes a feedback resource pool; the method further includes: contending, by the second D2D device, with the another D2D device for the location of the time-frequency resource in the feedback resource pool; and the sending, by the second D2D device, a second message to the first D2D device includes: sending, by the second D2D device, the second message to the first D2D device on a time-frequency resource corresponding to the location of the time-frequency resource obtained through contention.

With reference to the fifth aspect, the first possible implementation of the fifth aspect, the second possible implementation of the fifth aspect, the third possible implementation of the fifth aspect, or the fourth possible implementation of the fifth aspect, in a fifth possible implementation, the contending, by the second D2D device, with the another D2D device for the location of the time-frequency resource in the feedback resource pool includes: setting, by the second D2D device, a timer for contending for the time-frequency resource in the feedback resource pool, where a timing value of the timer is a value of a monotonically decreasing function in which an independent variable represents the coverage ratio; starting, by the second D2D device, timing simultaneously with the another D2D device, and contending for the location of the time-frequency resource in the feedback resource pool, where the another D2D device also sets the timer; and when the timer set by the second D2D device first expires, obtaining, by the second D2D device through contention, the time-frequency resource in the feedback resource pool.

According to a sixth aspect, a first user direct connection communication D2D device is provided. The device includes a sending unit, a receiving unit, and a processing unit. The sending unit is configured to send a first message to a second D2D device at a first transmit power, where the first message carries expected coverage performance of the first D2D device, so that the second D2D device sends a second message to a network device according to the first message and actual coverage performance of the first D2D device relative to the second D2D device, where the second message carries a coverage ratio of the actual coverage performance to the expected coverage performance, so that the network device generates a power adjustment indication message according to the coverage ratio and sends the power adjustment indication message to the first D2D device. The receiving unit is configured to receive the power adjustment indication message sent by the network device. The processing unit is configured to adjust a transmit power of the first message to be a second transmit power according to the power adjustment indication message.

In a first possible implementation, if the expected coverage performance is an expected coverage distance, the first message further includes location information of the first D2D device.

With reference to the sixth aspect or the first possible implementation of the sixth aspect, in a second possible implementation, the first message and the second message further include an identifier of the first D2D device.

With reference to the sixth aspect, the first possible implementation of the sixth aspect, or the second possible implementation of the sixth aspect, in a third possible implementation, the second message is sent by the second D2D device to the network device on a time-frequency resource indicated to the second D2D device by the network device.

With reference to the sixth aspect, the first possible implementation of the sixth aspect, the second possible implementation of the sixth aspect, or the third possible implementation of the sixth aspect, in a fourth possible implementation, the sending unit broadcasts the first message to multiple second D2D devices, and the second message is sent by the second D2D device to the network device on a time-frequency resource obtained through contention, where the second D2D device first obtains through contention the time-frequency resource in a feedback resource pool of the network device among the multiple second D2D devices contending for a time-frequency resource in the feedback resource pool.

With reference to the sixth aspect, the first possible implementation of the sixth aspect, the second possible implementation of the sixth aspect, the third possible implementation of the sixth aspect, or the fourth possible implementation of the sixth aspect, in a fifth possible implementation, the receiving unit is further configured to receive a time-frequency resource indication message indicated to the first D2D device by the network device, where the time-frequency resource indication message includes information about a location of a time-frequency resource; and that the sending unit performs the step of sending a first message to a second D2D device at a first transmit power includes: sending, by the first D2D device, the first message to the second D2D device at the first transmit power on a time-frequency resource corresponding to the location of the time-frequency resource.

With reference to the sixth aspect, the first possible implementation of the sixth aspect, the second possible implementation of the sixth aspect, the third possible implementation of the sixth aspect, the fourth possible implementation of the sixth aspect, or the fifth possible implementation of the sixth aspect, in a sixth possible implementation, the power adjustment indication message includes information indicating a transmit power adjustment step; and that the processing unit performs the step of adjusting a transmit power of the first message to be a second transmit power according to the power adjustment indication message includes: obtaining the second transmit power according to the power adjustment indication message, and sending the first message at the second transmit power, where the second transmit power is a smaller power value between a maximum rated transmit power of the first D2D device and a sum of the first transmit power and the transmit power adjustment step.

With reference to the sixth aspect, the first possible implementation of the sixth aspect, the second possible implementation of the sixth aspect, the third possible implementation of the sixth aspect, the fourth possible implementation of the sixth aspect, the fifth possible implementation of the sixth aspect, or the sixth possible implementation of the sixth aspect, in a seventh possible implementation, the information indicating the transmit power adjustment step is specifically an N-bit field, where N is a positive integer, and the N-bit field is used to indicate a maximum of 2N transmit power adjustment steps.

With reference to the sixth aspect, the first possible implementation of the sixth aspect, the second possible implementation of the sixth aspect, the third possible implementation of the sixth aspect, the fourth possible implementation of the sixth aspect, the fifth possible implementation of the sixth aspect, the sixth possible implementation of the sixth aspect, or the seventh possible implementation of the sixth aspect, in an eighth possible implementation, the actual coverage performance includes any one of an actual coverage distance, an actual receive level, or an actual receive signal to interference plus noise ratio; and the expected coverage performance includes any one of an expected coverage distance, an expected receive level, or an expected receive signal to interference plus noise ratio.

According to a seventh aspect, a second user direct connection communication D2D device is provided, including: a receiving unit, a processing unit, and a sending unit. The receiving unit is configured to receive a first message sent by a first D2D device at a first transmit power, where the first message carries expected coverage performance of the first D2D device. The processing unit is configured to obtain actual coverage performance of the first D2D device relative to the second D2D device. The sending unit is configured to send a second message to a network device, where the second message carries a coverage ratio of the actual coverage performance to the expected coverage performance, so that the network device generates a power adjustment indication message according to the coverage ratio and sends the power adjustment indication message to the first D2D device.

In a first possible implementation, if the expected coverage performance is an expected coverage distance, the first message further includes location information of the first D2D device.

With reference to the seventh aspect or the first possible implementation of the seventh aspect, in a second possible implementation, the first message and the second message further include an identifier of the first D2D device.

With reference to the seventh aspect, the first possible implementation of the seventh aspect, or the second possible implementation of the seventh aspect, in a third possible implementation, the receiving unit is further configured to obtain a time-frequency resource indication message sent by the network device, where the time-frequency resource indication message includes information about a location of a time-frequency resource on which the second message is sent; and that the sending unit performs the step of sending a second message to a network device includes: sending the second message to the network device on a time-frequency resource corresponding to the location of the time-frequency resource.

With reference to the seventh aspect, the first possible implementation of the seventh aspect, the second possible implementation of the seventh aspect, or the third possible implementation of the seventh aspect, in a fourth possible implementation, another D2D device also receives the first message sent by the first D2D device, the information about the location of the time-frequency resource on which the second message is sent is information about a location of at least one time-frequency resource on which the second message is sent, and the location of the time-frequency resource on which the second message is sent constitutes a feedback resource pool; the processing unit is further configured to contend with the another D2D device for the location of the time-frequency resource in the feedback resource pool; and that the sending unit performs the step of sending a second message to a network device includes: sending the second message to the network device on a time-frequency resource corresponding to the location of the time-frequency resource obtained through contention.

With reference to the seventh aspect, the first possible implementation of the seventh aspect, the second possible implementation of the seventh aspect, the third possible implementation of the seventh aspect, or the fourth possible implementation of the seventh aspect, in a fifth possible implementation, that the processing unit performs the step of contending with the another D2D device for the location of the time-frequency resource in the feedback resource pool includes: setting a timer for contending for the location of the time-frequency resource in the feedback resource pool, where a timing value of the timer is a value of a monotonically decreasing function in which an independent variable represents the coverage ratio; starting timing simultaneously with the another D2D device, and contending for the location of the time-frequency resource in the feedback resource pool, where the another D2D device also sets the timer; and when the timer set by the second D2D device first expires, obtaining through contention the time-frequency resource in the feedback resource pool.

According to an eighth aspect, a network device is provided, including: a receiving unit, a processing unit, and a sending unit. The receiving unit is configured to receive a second message sent by a second user direct connection communication D2D device, where the second message carries a coverage ratio of actual coverage performance to expected coverage performance of a first D2D device, the actual coverage performance is actual coverage performance of the first D2D device relative to the second D2D device, and the expected coverage performance is carried in a first message sent by the first D2D device to the second D2D device at a first transmit power. The processing unit is configured to generate a power adjustment indication message according to the coverage ratio. The sending unit is configured to send the power adjustment indication message to the first D2D device, so that the first D2D device adjusts a transmit power of the first message to be a second transmit power according to the power adjustment indication message.

In a first possible implementation, if the expected coverage performance is an expected coverage distance, the first message further includes location information of the first D2D device.

With reference to the eighth aspect or the first possible implementation of the eighth aspect, in a second possible implementation, the first message and the second message further include an identifier of the first D2D device.

With reference to the eighth aspect, the first possible implementation of the eighth aspect, or the second possible implementation of the eighth aspect, in a third possible implementation, the sending unit is further configured to send a time-frequency resource indication message to the second D2D device, where the time-frequency resource indication message includes information about a location of a time-frequency resource, so that the second D2D device sends the second message to the network device on a time-frequency resource corresponding to the location of the time-frequency resource.

With reference to the eighth aspect, the first possible implementation of the eighth aspect, the second possible implementation of the eighth aspect, or the third possible implementation of the eighth aspect, in a fourth possible implementation, the first D2D device broadcasts the first message to multiple second D2D devices. The processing unit is further configured to set a feedback resource pool for the multiple second D2D devices, where the feedback resource pool includes a location of at least one time-frequency resource on which the second message is sent. That the receiving unit performs the step of receiving a second message sent by a second D2D device includes receiving a second message sent on a time-frequency resource corresponding to a location of a time-frequency resource by a second D2D device that obtains through contention the location of the time-frequency resource in the feedback resource pool among the multiple second D2D devices.

With reference to the eighth aspect, the first possible implementation of the eighth aspect, the second possible implementation of the eighth aspect, the third possible implementation of the eighth aspect, or the fourth possible implementation of the eighth aspect, in a fifth possible implementation, the power adjustment indication message includes information indicating a transmit power adjustment step, and the information indicating the transmit power adjustment step is an N-bit field, where N is a positive integer, and the N-bit field is used to indicate a maximum of $2^N$ transmit power adjustment steps.

According to a ninth aspect, a first user direct connection communication D2D device is provided, including: a sending unit, a receiving unit, and a processing unit. The sending unit is configured to send a first message to a second D2D device at a first transmit power, where the first message carries information about expected coverage performance, so that the second D2D device sends a second message to the first D2D device according to the first message and actual coverage performance of the first D2D device relative to the second D2D device, and the second message carries a coverage ratio of the actual coverage performance to the expected coverage performance. The receiving unit is configured to receive the second message sent by the second D2D device. The processing unit is configured to adjust a transmit power of the first message to be a second transmit power according to the coverage ratio.

In a first possible implementation, if the expected coverage performance is an expected coverage distance, the first message further includes location information of the first D2D device.

With reference to the ninth aspect or the first possible implementation of the ninth aspect, in a second possible implementation, the first message and the second message further include an identifier of the first D2D device.

With reference to the ninth aspect, the first possible implementation of the ninth aspect, or the second possible implementation of the ninth aspect, in a third possible implementation, the second message is sent by the second D2D device to the first D2D device on a time-frequency resource indicated to the second D2D device by the network device.

With reference to the ninth aspect, the first possible implementation of the ninth aspect, the second possible implementation of the ninth aspect, or the third possible implementation of the ninth aspect, in a fourth possible implementation, the sending unit broadcasts the first message to multiple second D2D devices, and the second message is sent by the second D2D device to the first D2D device on a time-frequency resource obtained through contention in a feedback resource pool of the network device, where the second D2D device first obtains through contention the time-frequency resource among the multiple second D2D devices contending for a time-frequency resource in the feedback resource pool.

With reference to the ninth aspect, the first possible implementation of the ninth aspect, the second possible implementation of the ninth aspect, the third possible implementation of the ninth aspect, or the fourth possible implementation of the ninth aspect, in a fifth possible implementation, the receiving unit is further configured to receive a time-frequency resource indication message indicated to the first D2D device by the network device, where the time-frequency resource indication message includes information about a location of a time-frequency resource; and that the sending unit performs the step of sending a first message to a second D2D device at a first transmit power includes: sending the first message to the second D2D device at the first transmit power on a time-frequency resource corresponding to the location of the time-frequency resource.

With reference to the ninth aspect, the first possible implementation of the ninth aspect, the second possible implementation of the ninth aspect, the third possible implementation of the ninth aspect, the fourth possible implementation of the ninth aspect, or the fifth possible implementation of the ninth aspect, in a sixth possible implementation, that the processing unit performs the step of adjusting a transmit power of the first message to be a second transmit power according to the coverage ratio includes: determining a transmit power adjustment step according to the coverage ratio; and obtaining the second transmit power according to the transmit power adjustment step, and sending the first message at the second transmit power, where the second transmit power is a smaller power value between a maximum rated transmit power of the first D2D device and a sum of the first transmit power and the transmit power adjustment step.

With reference to the ninth aspect, the first possible implementation of the ninth aspect, the second possible implementation of the ninth aspect, the third possible implementation of the ninth aspect, the fourth possible implementation of the ninth aspect, the fifth possible implementation of the ninth aspect, or the sixth possible implementation of the ninth aspect, in a seventh possible implementation, the actual coverage performance includes any one of an actual coverage distance, an actual receive level, or an actual receive signal to interference plus noise ratio; and the expected coverage performance includes any one of an expected coverage distance, an expected receive level, or an expected receive signal to interference plus noise ratio.

According to a tenth aspect, a second user direct connection communication D2D device is provided, including: a receiving unit, a processing unit, and a sending unit. The receiving unit is configured to receive a first message sent by a first D2D device at a first transmit power, where the first message carries information about expected coverage performance of the first D2D device. The processing unit is configured to obtain actual coverage performance of the first D2D device relative to the second D2D device. The sending unit is configured to send a second message to the first D2D device, where the second message carries a coverage ratio of the actual coverage performance to the expected coverage performance.

In a first possible implementation, if the expected coverage performance is an expected coverage distance, the first message further includes location information of the first D2D device.

With reference to the tenth aspect or the first possible implementation of the tenth aspect, in a second possible implementation, the first message and the second message further include an identifier of the first D2D device.

With reference to the tenth aspect, the first possible implementation of the tenth aspect, or the second possible implementation of the tenth aspect, in a third possible implementation, the receiving unit is further configured to obtain a time-frequency resource indication message sent by a network device, where the time-frequency resource indication message includes information about a location of a time-frequency resource on which the second message is sent; and that the sending unit performs the step of sending a second message to the first D2D device includes: sending the second message to the first D2D device on a time-frequency resource corresponding to the location of the time-frequency resource.

With reference to the tenth aspect, the first possible implementation of the tenth aspect, the second possible implementation of the tenth aspect, or the third possible implementation of the tenth aspect, in a fourth possible implementation, another D2D device also receives the first message sent by the first D2D device, the information about the location of the time-frequency resource on which the second message is sent is information about a location of at least one time-frequency resource on which the second message is sent, and the location of the time-frequency resource on which the second message is sent constitutes a feedback resource pool; the processing unit is further configured to contend with the another D2D device for the location of the time-frequency resource in the feedback resource pool; and that the sending unit performs the step of sending a second message to the first D2D device includes: sending the second message to the first D2D device on a time-frequency resource corresponding to the location of the time-frequency resource obtained through contention.

With reference to the tenth aspect, the first possible implementation of the tenth aspect, the second possible implementation of the tenth aspect, the third possible implementation of the tenth aspect, or the fourth possible implementation of the tenth aspect, in a fifth possible implementation, that the processing unit performs the step of contending with the another D2D device for the location of the time-frequency resource in the feedback resource pool includes: setting a timer for contending for the time-frequency resource in the feedback resource pool, where a timing value of the timer is a value of a monotonically decreasing function in which an independent variable represents the coverage ratio; starting timing simultaneously with the another D2D device, and contending for the location of the time-frequency resource in the feedback resource pool, where the another D2D device also sets the timer; and when the timer set by the second D2D device first expires, obtaining through contention the time-frequency resource in the feedback resource pool.

According to an eleventh aspect, a first D2D device is provided, including: an input apparatus, an output apparatus, a memory, and a processor. The processor performs the following steps: sending a first message to a second D2D device at a first transmit power, where the first message carries expected coverage performance of the first D2D device, so that the second D2D device sends a second message to a network device according to the first message and actual coverage performance of the first D2D device relative to the second D2D device, where the second message carries a coverage ratio of the actual coverage performance to the expected coverage performance, so that the network device generates a power adjustment indication message according to the coverage ratio and sends the power adjustment indication message to the first D2D device; receiving the power adjustment indication message sent by the network device; and adjusting a transmit power of the first message to be a second transmit power according to the power adjustment indication message.

In a first possible implementation, if the expected coverage performance is an expected coverage distance, the first message further includes location information of the first D2D device.

With reference to the eleventh aspect or the first possible implementation of the eleventh aspect, in a second possible implementation, the first message and the second message further include an identifier of the first D2D device.

With reference to the eleventh aspect, the first possible implementation of the eleventh aspect, or the second possible implementation of the eleventh aspect, in a third possible implementation, the second message is sent by the second D2D device to the network device on a time-frequency resource indicated to the second D2D device by the network device.

With reference to the eleventh aspect, the first possible implementation of the eleventh aspect, the second possible implementation of the eleventh aspect, or the third possible implementation of the eleventh aspect, in a fourth possible implementation, the first D2D device broadcasts the first message to multiple second D2D devices, and the second message is sent by the second D2D device to the first D2D device on a time-frequency resource obtained through contention in a feedback resource pool of the network device, where the second D2D device first obtains through contention the time-frequency resource among the multiple second D2D devices contending for a time-frequency resource in the feedback resource pool.

With reference to the eleventh aspect, the first possible implementation of the eleventh aspect, the second possible implementation of the eleventh aspect, the third possible implementation of the eleventh aspect, or the fourth possible implementation of the eleventh aspect, in a fifth possible implementation, before performing the step of sending a first message to a second D2D device at a first transmit power, the processor further performs the following step: receiving a time-frequency resource indication message indicated to the first D2D device by the network device, where the time-frequency resource indication message includes information about a location of a time-frequency resource; and that the processor performs the step of sending a first message to a second D2D device at a first transmit power includes: sending the first message to the second D2D device at the first transmit power on a time-frequency resource corresponding to the location of the time-frequency resource.

With reference to the eleventh aspect, the first possible implementation of the eleventh aspect, the second possible implementation of the eleventh aspect, the third possible implementation of the eleventh aspect, the fourth possible implementation of the eleventh aspect, or the fifth possible implementation of the eleventh aspect, in a sixth possible implementation, the power adjustment indication message includes information indicating a transmit power adjustment step; and that the processor performs the step of adjusting a transmit power of the first message to be a second transmit power according to the power adjustment indication message includes: obtaining the second transmit power according to the power adjustment indication message, and sending the first message at the second transmit power, where the second transmit power is a smaller power value between a maximum rated transmit power of the first D2D device and a sum of the first transmit power and the transmit power adjustment step.

With reference to the eleventh aspect, the first possible implementation of the eleventh aspect, the second possible implementation of the eleventh aspect, the third possible implementation of the eleventh aspect, the fourth possible implementation of the eleventh aspect, the fifth possible implementation of the eleventh aspect, or the sixth possible implementation of the eleventh aspect, in a seventh possible implementation, the information indicating the transmit power adjustment step is specifically an N-bit field, where N is a positive integer, and the N-bit field is used to indicate a maximum of $2^N$ transmit power adjustment steps.

With reference to the eleventh aspect, the first possible implementation of the eleventh aspect, the second possible implementation of the eleventh aspect, the third possible implementation of the eleventh aspect, the fourth possible implementation of the eleventh aspect, the fifth possible implementation of the eleventh aspect, the sixth possible implementation of the eleventh aspect, or the seventh possible implementation of the eleventh aspect, in an eighth possible implementation, the actual coverage performance includes any one of an actual coverage distance, an actual receive level, or an actual receive signal to interference plus noise ratio; and the expected coverage performance includes any one of an expected coverage distance, an expected receive level, or an expected receive signal to interference plus noise ratio.

According to a twelfth aspect, a second D2D device is provided, including: an input apparatus, an output apparatus, a memory, and a processor, where the processor performs the following steps: receiving a first message sent by a first D2D device at a first transmit power, where the first message carries expected coverage performance of the first D2D device; obtaining actual coverage performance of the first D2D device relative to the second D2D device; and sending a second message to a network device, where the second message carries a coverage ratio of the actual coverage performance to the expected coverage performance, so that the network device generates a power adjustment indication message according to the coverage ratio and sends the power adjustment indication message to the first D2D device.

In a first possible implementation, if the expected coverage performance is an expected coverage distance, the first message further includes location information of the first D2D device.

With reference to the twelfth aspect or the first possible implementation of the twelfth aspect, in a second possible implementation, the first message and the second message further include an identifier of the first D2D device.

With reference to the twelfth aspect, the first possible implementation of the twelfth aspect, or the second possible implementation of the twelfth aspect, in a third possible implementation, before performing the step of sending a second message to a network device, the processor further performs the following step: obtaining a time-frequency resource indication message sent by the network device, where the time-frequency resource indication message includes information about a location of a time-frequency resource on which the second message is sent; and that the processor performs the step of sending a second message to a network device includes: sending the second message to the network device on a time-frequency resource corresponding to the location of the time-frequency resource.

With reference to the twelfth aspect, the first possible implementation of the twelfth aspect, the second possible implementation of the twelfth aspect, or the third possible implementation of the twelfth aspect, in a fourth possible implementation, another D2D device also receives the first message sent by the first D2D device, the information about the location of the time-frequency resource on which the second message is sent is information about a location of at least one time-frequency resource on which the second message is sent, and the location of the time-frequency resource on which the second message is sent constitutes a feedback resource pool; the processor further performs the following step: contending with the another D2D device for the location of the time-frequency resource in the feedback resource pool; and the performing the step of sending a second message to a network device includes: sending the second message to the network device on a time-frequency resource corresponding to the location of the time-frequency resource obtained through contention.

With reference to the twelfth aspect, the first possible implementation of the twelfth aspect, the second possible implementation of the twelfth aspect, the third possible implementation of the twelfth aspect, or the fourth possible implementation of the twelfth aspect, in a fifth possible implementation, that the processor performs the step of contending with the another D2D device for the location of the time-frequency resource in the feedback resource pool includes: setting a timer for contending for the location of the time-frequency resource in the feedback resource pool, where a timing value of the timer is a value of a monotonically decreasing function in which an independent variable represents the coverage ratio; starting timing simultaneously with the another D2D device, and contending for the location of the time-frequency resource in the feedback resource pool, where the another D2D device also sets the timer; and when the timer set by the second D2D device first expires, obtaining, by the second D2D device through contention, the time-frequency resource in the feedback resource pool.

According to a thirteenth aspect, a network device is provided, including: an input apparatus, an output apparatus, a memory, and a processor. The processor performs the following steps: receiving a second message sent by a second user direct connection communication D2D device, where the second message carries a coverage ratio of actual coverage performance to expected coverage performance of a first D2D device, the actual coverage performance is actual coverage performance of the first D2D device relative to the second D2D device, and the expected coverage performance is carried in a first message sent by the first D2D device to the second D2D device at a first transmit power; generating a power adjustment indication message according to the coverage ratio; and sending the power adjustment indication message to the first D2D device, so that the first D2D device adjusts a transmit power of the first message to be a second transmit power according to the power adjustment indication message.

In a first possible implementation, if the expected coverage performance is an expected coverage distance, the first message further includes location information of the first D2D device.

With reference to the thirteenth aspect or the first possible implementation of the thirteenth aspect, in a second possible implementation, the first message and the second message further include an identifier of the first D2D device.

With reference to the thirteenth aspect, the first possible implementation of the thirteenth aspect, or the second possible implementation of the thirteenth aspect, in a third possible implementation, before performing the step of receiving a second message sent by a second D2D device, the processor further performs the following step: sending a time-frequency resource indication message to the second D2D device, where the time-frequency resource indication message includes information about a location of a time-frequency resource, so that the second D2D device sends the second message to the network device on a time-frequency resource corresponding to the location of the time-frequency resource.

With reference to the thirteenth aspect, the first possible implementation of the thirteenth aspect, the second possible implementation of the thirteenth aspect, or the third possible implementation of the thirteenth aspect, in a fourth possible implementation, the first D2D device broadcasts the first message to multiple second D2D devices, and the processor further performs the following step: setting a feedback resource pool for the multiple second D2D devices, where the feedback resource pool includes a location of at least one time-frequency resource on which the second message is sent; and that the processor performs the step of receiving a second message sent by a second D2D device includes: receiving a second message sent on a time-frequency resource corresponding to a location of a time-frequency resource by a second D2D device that obtains through contention the location of the time-frequency resource in the feedback resource pool among the multiple second D2D devices.

With reference to the thirteenth aspect, the first possible implementation of the thirteenth aspect, the second possible implementation of the thirteenth aspect, the third possible implementation of the thirteenth aspect, or the fourth possible implementation of the thirteenth aspect, in a fifth possible implementation, the power adjustment indication message includes information indicating a transmit power adjustment step, and the information indicating the transmit power adjustment step is an N-bit field, where N is a positive integer, and the N-bit field is used to indicate a maximum of $2^N$ transmit power adjustment steps.

According to a fourteenth aspect, a first D2D device is provided, including: an input apparatus, an output apparatus, a memory, and a processor. The processor performs the following steps: sending a first message to a second D2D device at a first transmit power, where the first message carries information about expected coverage performance, so that the second D2D device sends a second message to the first D2D device according to the first message and actual coverage performance of the first D2D device relative to the second D2D device, and the second message carries a coverage ratio of the actual coverage performance to the expected coverage performance; receiving the second message sent by the second D2D device; and adjusting a transmit power of the first message to be a second transmit power according to the coverage ratio.

In a first possible implementation, if the expected coverage performance is an expected coverage distance, the first message further includes location information of the first D2D device.

With reference to the fourteenth aspect or the first possible implementation of the fourteenth aspect, in a second possible implementation, the first message and the second message further include an identifier of the first D2D device.

With reference to the fourteenth aspect, the first possible implementation of the fourteenth aspect, or the second possible implementation of the fourteenth aspect, in a third possible implementation, the second message is sent by the second D2D device to the first D2D device on a time-frequency resource indicated to the second D2D device by the network device.

With reference to the fourteenth aspect, the first possible implementation of the fourteenth aspect, the second possible implementation of the fourteenth aspect, or the third possible implementation of the fourteenth aspect, in a fourth possible implementation, the first D2D device broadcasts the first message to multiple second D2D devices, and the second message is sent by the second D2D device to the first D2D device on a time-frequency resource obtained through contention in a feedback resource pool of the network device, where the second D2D device first obtains through contention the time-frequency resource among the multiple second D2D devices contending for a time-frequency resource in the feedback resource pool.

With reference to the fourteenth aspect, the first possible implementation of the fourteenth aspect, the second possible implementation of the fourteenth aspect, the third possible implementation of the fourteenth aspect, or the fourth possible implementation of the fourteenth aspect, in a fifth possible implementation, before performing the step of sending a first message to a second D2D device at a first transmit power, the processor further performs the following step: receiving a time-frequency resource indication message indicated to the first D2D device by the network device, where the time-frequency resource indication message includes information about a location of a time-frequency resource; and that the processor performs the step of sending a first message to a second D2D device at a first transmit power includes: sending the first message to the second D2D device at the first transmit power on a time-frequency resource corresponding to the location of the time-frequency resource.

With reference to the fourteenth aspect, the first possible implementation of the fourteenth aspect, the second possible implementation of the fourteenth aspect, the third possible implementation of the fourteenth aspect, the fourth possible implementation of the fourteenth aspect, or the fifth possible implementation of the fourteenth aspect, in a sixth possible implementation, that the processor performs the step of adjusting a transmit power of the first message to be a second transmit power according to the coverage ratio includes: determining a transmit power adjustment step according to the coverage ratio; and obtaining the second transmit power according to the transmit power adjustment step, and sending the first message at the second transmit power, where the second transmit power is a smaller power value between a maximum rated transmit power of the first D2D device and a sum of the first transmit power and the transmit power adjustment step.

With reference to the fourteenth aspect, the first possible implementation of the fourteenth aspect, the second possible implementation of the fourteenth aspect, the third possible implementation of the fourteenth aspect, the fourth possible implementation of the fourteenth aspect, the fifth possible implementation of the fourteenth aspect, or the sixth possible implementation of the fourteenth aspect, in a seventh possible implementation, the actual coverage performance includes any one of an actual coverage distance, an actual receive level, or an actual receive signal to interference plus noise ratio; and the expected coverage performance includes any one of an expected coverage distance, an expected receive level, or an expected receive signal to interference plus noise ratio.

According to a fifteenth aspect, a second D2D device is provided, including: an input apparatus, an output apparatus, a memory, and a processor. The processor performs the following steps: receiving a first message sent by a first D2D device at a first transmit power, where the first message carries information about expected coverage performance of the first D2D device; obtaining actual coverage performance of the first D2D device relative to the second D2D device; and sending a second message to the first D2D device, where the second message carries a coverage ratio of the actual coverage performance to the expected coverage performance.

In a first possible implementation, if the expected coverage performance is an expected coverage distance, the first message further includes location information of the first D2D device.

With reference to the fifteenth aspect or the first possible implementation of the fifteenth aspect, in a second possible implementation, the first message and the second message further include an identifier of the first D2D device.

With reference to the fifteenth aspect, the first possible implementation of the fifteenth aspect, or the second possible implementation of the fifteenth aspect, in a third possible implementation, before performing the step of sending a second message to the first D2D device, the processor further performs the following step: obtaining a time-frequency resource indication message sent by a network device, where the time-frequency resource indication message includes information about a location of a time-frequency resource on which the second message is sent; and that the processor performs the step of sending a second message to the first D2D device includes: sending the second message to the first D2D device on a time-frequency resource corresponding to the location of the time-frequency resource.

With reference to the fifteenth aspect, the first possible implementation of the fifteenth aspect, the second possible implementation of the fifteenth aspect, or the third possible implementation of the fifteenth aspect, in a fourth possible implementation, another D2D device also receives the first message sent by the first D2D device, the information about the location of the time-frequency resource on which the second message is sent is information about a location of at least one time-frequency resource on which the second message is sent, and the location of the time-frequency resource on which the second message is sent constitutes a feedback resource pool; the processor further performs the following step: contending with the another D2D device for the location of the time-frequency resource in the feedback resource pool; and that the processor performs the step of sending a second message to the first D2D device includes: sending the second message to the first D2D device on a time-frequency resource corresponding to the location of the time-frequency resource obtained through contention.

With reference to the fifteenth aspect, the first possible implementation of the fifteenth aspect, the second possible implementation of the fifteenth aspect, the third possible implementation of the fifteenth aspect, or the fourth possible implementation of the fifteenth aspect, in a fifth possible implementation, that the processor performs the step of contending with the another D2D device for the location of the time-frequency resource in the feedback resource pool includes: setting a timer for contending for the time-frequency resource in the feedback resource pool, where a timing value of the timer is a value of a monotonically decreasing function in which an independent variable represents the coverage ratio; starting timing simultaneously with the another D2D device, and contending for the location of the time-frequency resource in the feedback resource pool, where the another D2D device also sets the timer; and when the timer set by the second D2D device first expires, obtaining, by the second D2D device through contention, the time-frequency resource in the feedback resource pool.

It can be learned that, according to the power control method and the device provided in the embodiments of the present invention, a network device generates a power adjustment indication message according to a coverage ratio of actual coverage performance of a first user direct connection communication device relative to a second user direct connection communication device to expected coverage performance of the first user direct connection communication device, and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

The embodiments of the present invention are applied to the D2D communication field, and relate to a transmitting user direct connection communication device (hereinafter referred to as a "first D2D device"), a receiving user direct connection communication device (hereinafter referred to as a "second D2D device"), and a network device. In the embodiments of the present invention, the network device may be a base station (BS), an access point (AP), remote radio equipment (RRE), a remote radio head (RRH), a remote radio unit (RRU), a relay node, or the like. A relationship between the network device and a cell is not limited. One network device may correspond to one or more cells, or one cell may correspond to one or more network devices.

In D2D communication, a transmit power of the first D2D device directly affects a receive signal level of the second D2D device, and further affects performance of a link between the first D2D device and the second D2D device. For example, in D2D unicast communication, a transmit power of the first D2D device should be set based on receive signal quality and an expected target level of the second D2D device, to achieve expected transmission performance.

In D2D broadcast communication, a message from the first D2D device needs to be received by all surrounding devices. In this case, appropriately setting a transmit power becomes more crucial, because in this case, there is more than one second D2D device needing guarantee of receive signal quality, and different second D2D devices also vary greatly in terms of reachable receive signal power levels.

Figure 1:
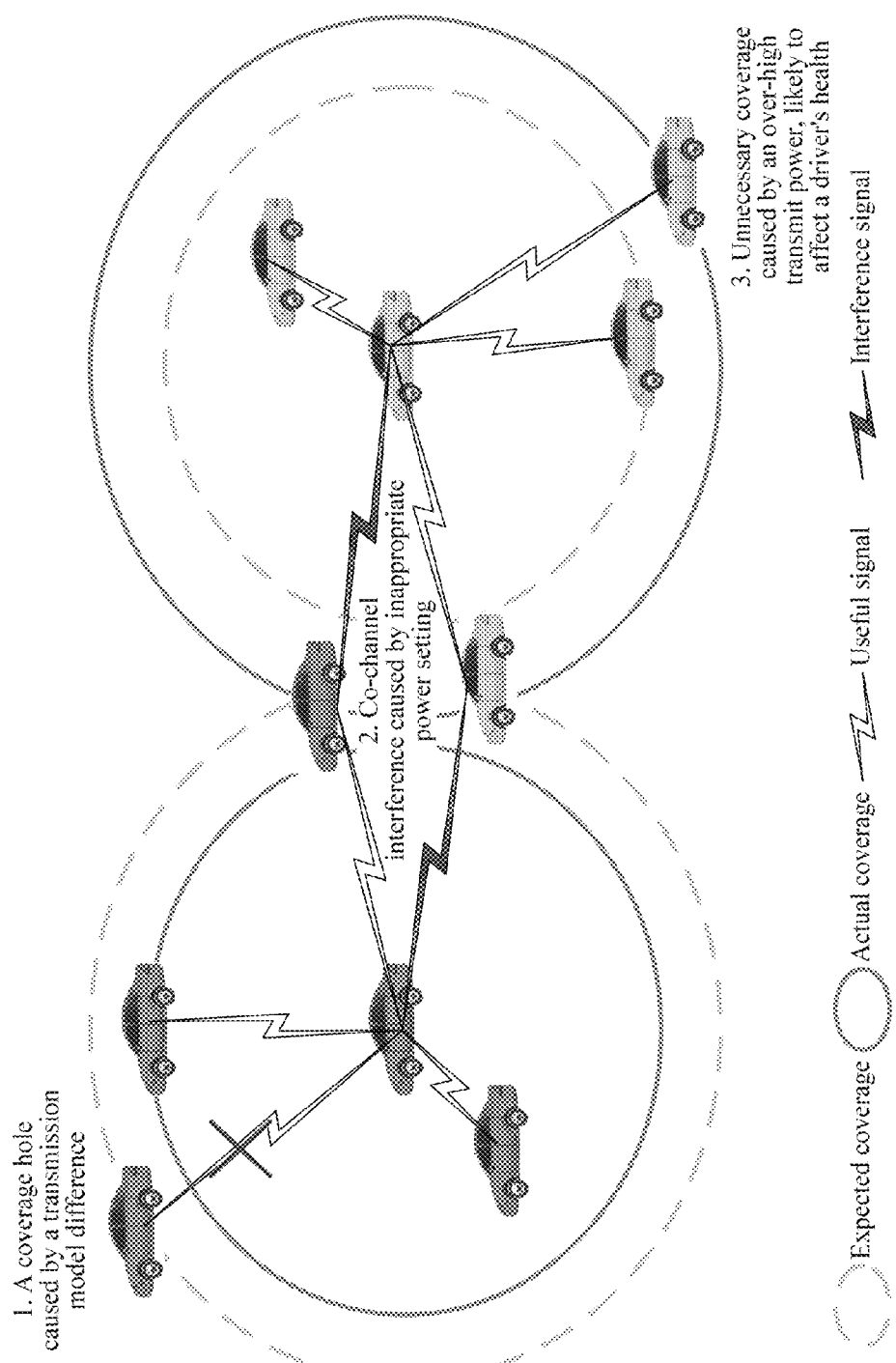
FIG. 1 is a schematic diagram of power setting.

In D2D broadcast communication, using an active safety application as an example, if a transmit power of a transmitting vehicle is inappropriately set, an expected coverage area and an actual coverage area of a transmitting node consequently have a great difference, causing relatively obvious impact on system performance. As shown in FIG. 1, if a lower power is set for the first D2D device, a message has a smaller coverage area, and consequently, some vehicles in a threat range cannot receive a safety message and can hardly discover and avoid a danger in time. If a higher power is set, a message has a larger coverage area, and an over-coverage problem is likely to occur. In this case, a vehicle in an overlapping coverage region cannot correctly receive a safety message and becomes a potentially threatened object, and a health problem also exists. This affects health of a driver of the transmitting vehicle, drivers of nearby vehicles, and nearby pedestrians.

In the embodiments of the present invention, a network device generates a power adjustment indication message according to a coverage ratio of actual coverage performance of a first user direct connection communication device relative to a second user direct connection communication device to expected coverage performance of the first user direct connection communication device, and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance.

Referring to FIG. 2 to FIG. 6 in the following, a first set of power control methods provided in the present invention are described in detail in embodiments.

Figure 2:
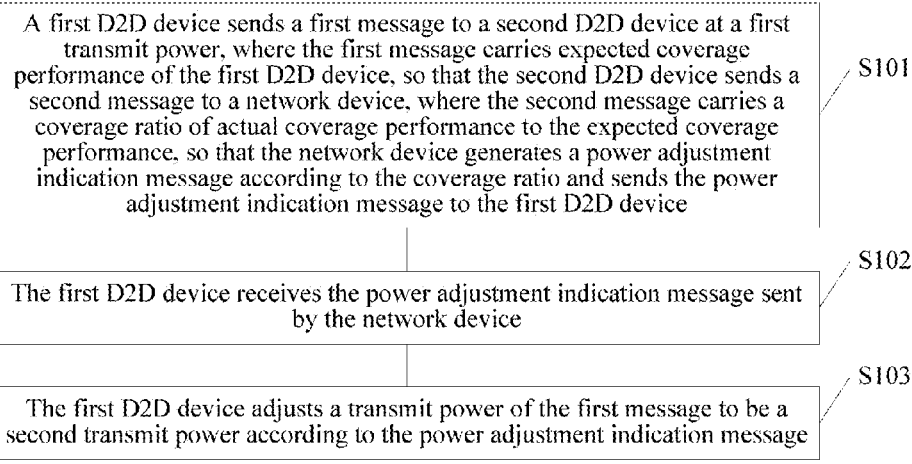
FIG. 2 is a schematic flowchart of a power control method according to an embodiment of the present invention.

Referring to FIG. 2, FIG. 2 is a schematic flowchart of a power control method according to an embodiment of the present invention. The method includes the following steps.

Step S101. A first user direct connection communication D2D device sends a first message to a second D2D device at a first transmit power, where the first message carries expected coverage performance of the first D2D device, so that the second D2D device sends a second message to a network device according to the first message and actual coverage performance of the first D2D device relative to the second D2D device, where the second message carries a coverage ratio of the actual coverage performance to the expected coverage performance, so that the network device generates a power adjustment indication message according to the coverage ratio and sends the power adjustment indication message to the first D2D device.

The first D2D device sends the first message to the second D2D device at the first transmit power. For a first D2D device sending the first message for the first time, the message may be sent at an initial default power (for example, a maximum rated power). The first message includes the expected coverage performance of the first D2D device. Herein, the expected coverage performance includes any one of an expected coverage distance, an expected receive level, or an expected receive signal to interference plus noise ratio.

Optionally, when the expected coverage performance is an expected coverage distance, the first message further includes location information of the first D2D device.

Optionally, the first message further includes an identifier of the first D2D device.

For example, in a D2D broadcast system, after the first D2D device sends the first message, all D2D devices (that is, second D2D devices) near the first D2D device attempt to decode the message. A second D2D device capable of correctly decoding the message can obtain information about the expected coverage performance of the first D2D device carried in the message. Herein, "sending" is a broadcast action.

After receiving the first message, the second D2D device parses the first message, to obtain the actual coverage performance of the first D2D device relative to the second D2D device. The actual coverage performance may similarly include any one of an actual coverage distance, an actual receive level, or an actual receive signal to interference plus noise ratio. For example, the coverage performance is a coverage distance. Because there may be multiple second D2D devices near the first D2D device, and distances between the multiple second D2D devices and the first D2D device may vary, each second D2D device may obtain an actual coverage distance between the second D2D device and the first D2D device according to location information of the second D2D device and location information of the first D2D device. Similarly, if the expected coverage performance is an expected receive level or an expected receive signal to interference plus noise ratio, the second D2D device may obtain an actual receive level or an actual receive signal to interference plus noise ratio for receiving the first message.

A parameter, that is, a coverage ratio, is defined herein. The coverage ratio is defined as a ratio of actual coverage performance of each second D2D device capable of correctly decoding the first message to expected coverage performance. Whether coverage of the first message matches an expectation can be obtained according to the coverage ratio. Using a coverage distance as an example, a coverage ratio greater than 1 represents that an actual coverage distance is greater than an expected coverage distance; a coverage ratio less than 1 represents that an actual coverage distance is less than an expected coverage distance. Whether the coverage of the first message matches the expectation can be simply and clearly reflected by defining the coverage ratio.

Then, the second D2D device sends the second message to the network device, where the second message carries the coverage ratio. The network device generates the power adjustment indication message for the first D2D device according to the received coverage ratio and sends the power adjustment indication message to the first D2D device. Specifically, when the coverage ratio fed back by the second D2D device is greater than 1, the network device may consider that the first transmit power set for the first D2D device is high and should be decreased appropriately. When the coverage ratio fed back by the second D2D device is less than 1, the network device may consider that the first transmit power set for the first D2D device is low and should be increased appropriately. When the coverage ratio fed back by the second D2D device is equal to 1, the network device may consider that the transmit power set for the first D2D device is appropriate and requires no adjustment. The network device includes these conclusions in the power adjustment indication message and sends the power adjustment indication message to the first D2D device.

Optionally, the second message further includes the identifier of the first D2D device, so that the network device sends the power adjustment indication message to the first D2D device.

Step S102. The first D2D device receives the power adjustment indication message sent by the network device.

The power adjustment indication message may include information indicating a transmit power adjustment step, or may include a specific transmit power value.

Step S103. The first D2D device adjusts a transmit power of the first message to be a second transmit power according to the power adjustment indication message.

The first D2D device adjusts the transmit power of the first message to be the second transmit power according to the power adjustment indication message sent by the network device. Adjustment control is performed on the transmit power according to the actual coverage performance, and therefore, the actual coverage performance of the first D2D device can match the expected coverage performance.

According to the power control method provided in this embodiment of the present invention, a network device generates a power adjustment indication message according to a coverage ratio of actual coverage performance of a first user direct connection communication device relative to a second user direct connection communication device to expected coverage performance of the first user direct connection communication device, and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance.

Figure 3:
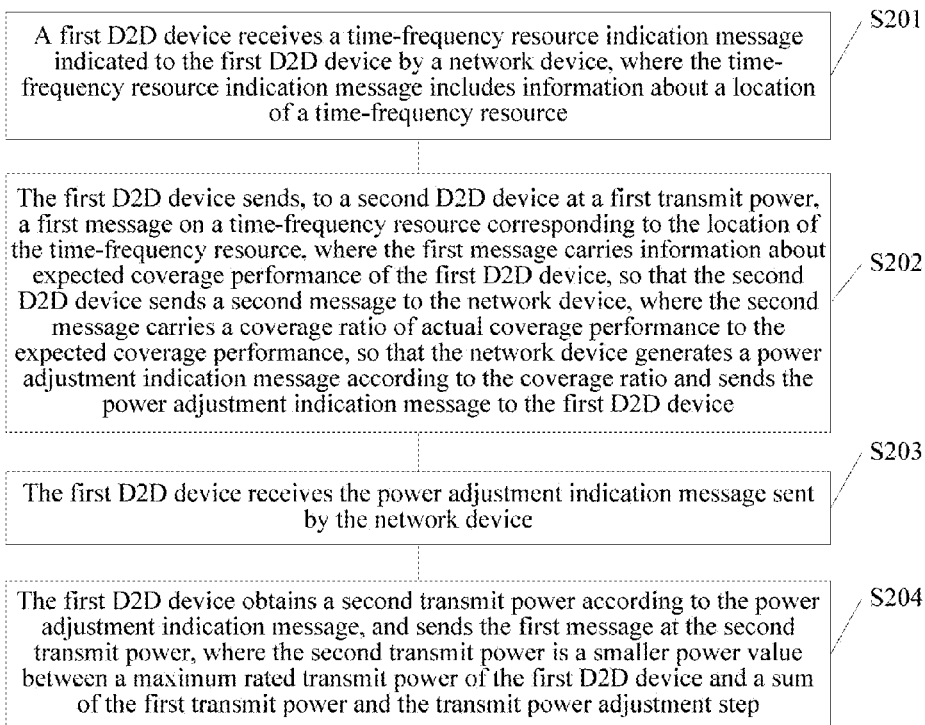
FIG. 3 is a schematic flowchart of another power control method according to an embodiment of the present invention.

Referring to FIG. 3, FIG. 3 is a schematic flowchart of another power control method according to an embodiment of the present invention. The method includes the following steps.

Step S201. A first D2D device receives a time-frequency resource indication message indicated to the first D2D device by a network device, where the time-frequency resource indication message includes information about a location of a time-frequency resource.

Because one network device usually manages more than one first D2D device, D2D communication in this embodiment of the present invention may be based on an aid of the network device, and the network device indicates a time-frequency resource to be occupied by the first D2D device, or the first D2D device contends for a time-frequency resource in a time-frequency resource pool of the network device. Specifically, the indication message includes information about a location of the time-frequency resource. This can avoid a transmission failure or interference to the second D2D device resulting from message transmission performed by multiple first D2D devices at a location of a same time-frequency resource.

Step S202. The first D2D device sends, to a second D2D device at a first transmit power, a first message on a time-frequency resource corresponding to the location of the time-frequency resource, where the first message carries information about expected coverage performance of the first D2D device, so that the second D2D device sends a second message to the network device according to the first message and actual coverage performance of the first D2D device relative to the second D2D device, where the second message carries a coverage ratio of the actual coverage performance to the expected coverage performance, so that the network device generates a power adjustment indication message according to the coverage ratio and sends the power adjustment indication message to the first D2D device.

Different from step S101 in the embodiment shown in FIG. 2, in this step, the first D2D device sends the first message on the time-frequency resource corresponding to the location of the time-frequency resource indicated by the network device.

It should be noted that the second message may also be sent by the second D2D device to the network device on a time-frequency resource indicated by the network device. Specifically, in a scenario in which the first D2D device broadcasts the first message to multiple second D2D devices, the second message may be sent by a second D2D device to the network device on a time-frequency resource obtained through contention in a feedback resource pool of the network device, where the second D2D device first obtains through contention the time-frequency resource among the multiple second D2D devices contending for a time-frequency resource in the feedback resource pool.

Step S203. The first D2D device receives the power adjustment indication message sent by the network device.

The first D2D device receives, by using an air interface, the power adjustment indication message sent by the network device. The air interface may include: physical layer signaling, Media Access Control layer signaling, or radio resource control signaling. The network device may send the power adjustment indication message to the first D2D device by using the air interface, so that the first D2D device can rapidly obtain the power adjustment indication message.

The power adjustment indication message includes information indicating a transmit power adjustment step. The information indicating a transmit power adjustment step is specifically N bits, where N is a positive integer, and $2^N$ cases can be indicated. For example, when N=3, eight cases can be indicated, such as −4, −3, −2, −1, 1, 2, 3, and 4, where a value represents a transmit power adjustment step value, and a unit may be dB.

Step S204. The first D2D device obtains the second transmit power according to the power adjustment indication message, and sends the first message at the second transmit power, where the second transmit power is a smaller power value between a maximum rated transmit power of the first D2D device and a sum of the first transmit power and the transmit power adjustment step.

Specifically, after receiving the power adjustment indication message from the network device, the first D2D device obtains a corresponding transmit power adjustment step value, and obtains the second transmit power according to the following formula:

$$PTX = \min(P\max, PTXo + \text{delta})$$

where PTX is the second transmit power, Pmax is the maximum rated transmit power of the first D2D device, PTXo is the first transmit power, and delta is the transmit power adjustment step value of the first D2D device.

Certainly, the power adjustment indication message may alternatively indicate an exact second transmit power.

According to the power control method provided in this embodiment of the present invention, a network device generates a power adjustment indication message according to a coverage ratio of actual coverage performance of a first user direct connection communication device relative to a second user direct connection communication device to expected coverage performance of the first user direct connection communication device, and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance. In addition, the first user direct connection communication device sends a first message on a time-frequency resource indicated by the network device. This can avoid a transmission failure or interference to receiving of the first message by the second user direct connection communication device caused by a time-frequency resource conflict with another first user direct connection communication device.

Figure 4:
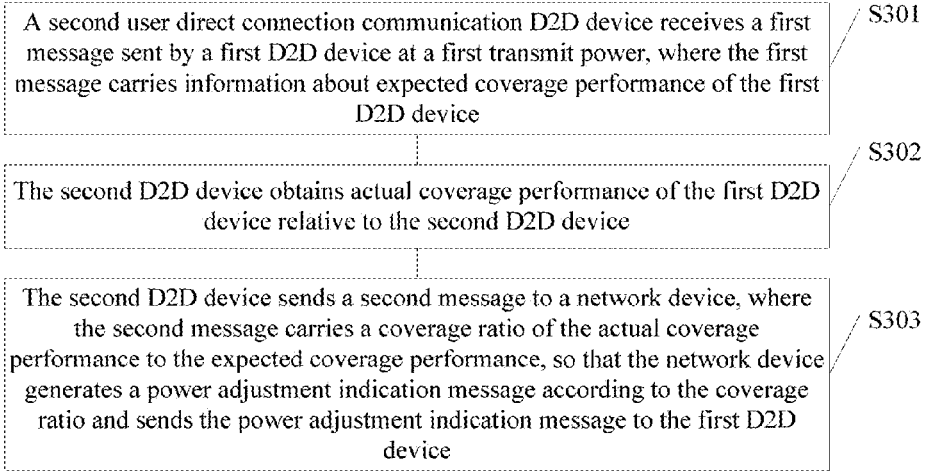
FIG. 4 is a schematic flowchart of still another power control method according to an embodiment of the present invention.

Referring to FIG. 4, FIG. 4 is a schematic flowchart of still another power control method according to an embodiment of the present invention. The method includes the following steps.

Step S301. A second user direct connection communication D2D device receives a first message sent by a first D2D device at a first transmit power, where the first message carries information about expected coverage performance of the first D2D device.

The second D2D device receives the first message sent by the first D2D device at the first transmit power. The first message includes the expected coverage performance of the first D2D device. Herein, the expected coverage performance includes any one of an expected coverage distance, an expected receive level, or an expected receive signal to interference plus noise ratio.

Step S302. The second D2D device obtains actual coverage performance of the first D2D device relative to the second D2D device.

After receiving the first message, the second D2D device parses the first message, to obtain the actual coverage performance of the first D2D device relative to the second D2D device. The actual coverage performance may similarly include any one of an actual coverage distance, an actual receive level, or an actual receive signal to interference plus noise ratio.

Optionally, the first message further includes an identifier of the first D2D device.

For example, the coverage performance is a coverage distance. Because there may be multiple second D2D devices near the first D2D device, and distances between the multiple second D2D devices and the first D2D device may vary, each second D2D device may obtain an actual coverage distance between the second D2D device and the first D2D device according to location information of the second D2D device and current location information of the first D2D device. The first message may further include the current location information of the first D2D device. Similarly, if the expected coverage performance is an expected receive level or an expected receive signal to interference plus noise ratio, the second D2D device may obtain an actual receive level or an actual receive signal to interference plus noise ratio for receiving the first message.

Step S303. The second D2D device sends a second message to a network device, where the second message carries a coverage ratio of the actual coverage performance to the expected coverage performance, so that the network device generates a power adjustment indication message according to the coverage ratio and sends the power adjustment indication message to the first D2D device.

A parameter, that is, a coverage ratio, is defined herein. The coverage ratio is defined as a ratio of actual coverage performance of the second D2D device to expected coverage performance. Whether coverage of the first message matches an expectation can be obtained according to the coverage ratio. Using a coverage distance as an example, a coverage ratio greater than 1 represents that an actual coverage distance is greater than an expected coverage distance; a coverage ratio less than 1 represents that an actual coverage distance is less than an expected coverage distance. Whether the coverage of the first message matches the expectation can be simply and clearly reflected by defining the coverage ratio.

The second D2D device sends the second message to the network device, where the second message carries the coverage ratio. The network device generates the power adjustment indication message for the first D2D device according to the received coverage ratio and sends the power adjustment indication message to the first D2D device. The first D2D device adjusts a transmit power of the first message to be a second transmit power according to the power adjustment indication message sent by the network device.

Optionally, the second message further includes the identifier of the first D2D device, so that the network device sends the power adjustment indication message to the first D2D device.

Adjustment control is performed on the transmit power according to the actual coverage performance, and therefore, the actual coverage performance of the first D2D device can match the expected coverage performance.

According to the power control method provided in this embodiment of the present invention, a second user direct connection communication device sends, to a network device, a coverage ratio of actual coverage performance of a first user direct connection communication device relative to the second user direct connection communication device to expected coverage performance of the first user direct connection communication device; the network device generates a power adjustment indication message according to the coverage ratio and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance.

Figure 5:
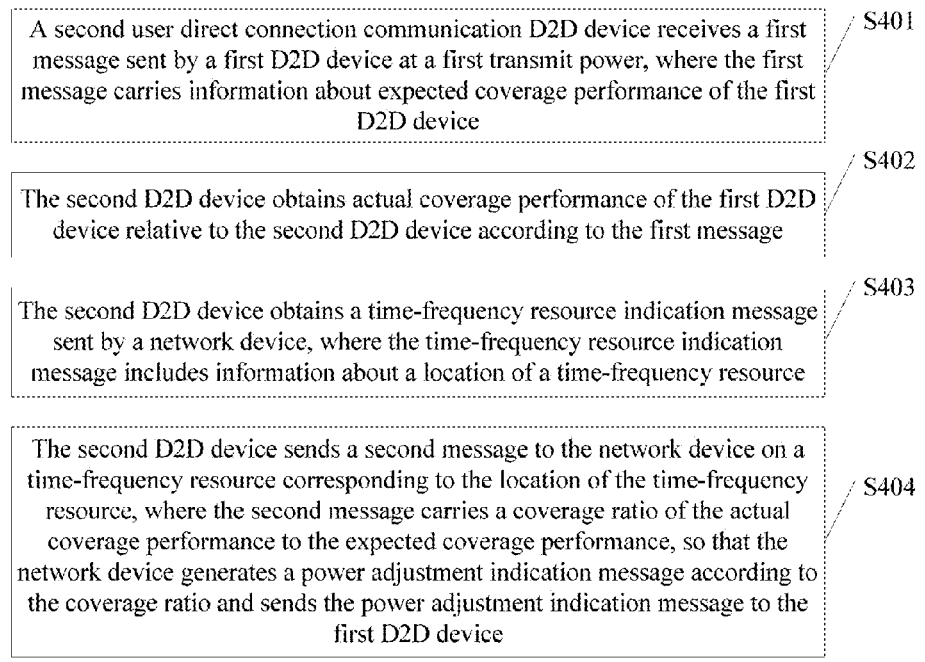
FIG. 5 is a schematic flowchart of still another power control method according to an embodiment of the present invention.

Referring to FIG. 5, FIG. 5 is a schematic flowchart of still another power control method according to an embodiment of the present invention. The method includes the following steps.

Step S401. A second user direct connection communication D2D device receives a first message sent by a first D2D device at a first transmit power, where the first message carries information about expected coverage performance of the first D2D device.

This step is the same as step S301 in the foregoing embodiment. Optionally, the first message may be sent on a time-frequency resource corresponding to a location of a time-frequency resource indicated by a network device.

Step S402. The second D2D device obtains actual coverage performance of the first D2D device relative to the second D2D device according to the first message.

This step is the same as step S302 in the foregoing embodiment.

For example, the coverage performance is a coverage distance. The second D2D device has a positioning apparatus and can obtain location information of the second D2D device by using a positioning system (for example, a GPS), and the first message may further include a current location of the first D2D device. Therefore, the second D2D device can obtain through calculation a distance between the second D2D device and the first D2D device according to the current location of the first D2D device and the location information of the second D2D device obtained by using the positioning system. There are multiple second D2D devices near the first D2D device, and distances obtained, through calculation, by second D2D devices capable of correctly decoding the message vary from each other. A parameter, that is, a coverage ratio of the message, is defined. The coverage ratio is defined as a ratio of an actual coverage distance of the message to an expected coverage distance of the message. Whether coverage of the message matches an expectation can be obtained according to the coverage ratio. For example, a coverage ratio greater than 1 represents that an actual coverage distance is greater than an expected coverage distance; a coverage ratio less than 1 represents that an actual coverage distance is less than an expected coverage distance.

Step S403. The second D2D device obtains a time-frequency resource indication message sent by a network device, where the time-frequency resource indication message includes information about a location of a time-frequency resource.

Step S404. The second D2D device sends a second message to the network device on a time-frequency resource corresponding to the location of the time-frequency resource, where the second message carries a coverage ratio of the actual coverage performance to the expected coverage performance, so that the network device generates a power adjustment indication message according to the coverage ratio and sends the power adjustment indication message to the first D2D device.

The second D2D device needs to feed back the coverage ratio to the network device. The network device indicates to the second D2D device the location of the time-frequency resource on which the second message carrying the coverage ratio is sent. The second D2D device obtains the time-frequency resource indication message sent by the network device. The indication message includes the location of the time-frequency resource. The second D2D device sends the second message to the network device on the time-frequency resource corresponding to the location of the time-frequency resource, so as to reliably send the second message to the network device.

It should be noted that, a performing order of steps S401 to S403 is not limited herein. The second D2D device may alternatively obtain, before receiving the first message from the first D2D device, the time-frequency resource indication message sent by the network device.

In a broadcast scenario, another D2D device may also receive the first message sent by the first D2D device. Each second D2D device can obtain a distance between the second D2D device and the first D2D device, but the second D2D device does not know whether the distance between the second D2D device and the first D2D device is the farthest, that is, whether a coverage ratio of the message obtained by the second D2D device through calculation is the largest among all second D2D devices. To reduce signaling overheads and complexity resulting from distance comparison between the second D2D devices, a distributed contention comparison and feedback mechanism is designed in this embodiment of the present invention. The network device sets, for the second D2D device and the another D2D device, a feedback resource pool used for coverage capability feedback of the second D2D device and the another D2D device, and indicates information about the feedback resource pool to the second D2D device by using a time-frequency resource indication message. Therefore, the second D2D device can obtain the information about the resource pool that can be used for coverage capability feedback. A location of a time-frequency resource on which the second message is sent constitutes the feedback resource pool.

After step S403 and before step S404, the method may further include the following steps.

Step A. The second D2D device contends with another D2D device for a location of a time-frequency resource in the feedback resource pool.

Therefore, step S404 specifically includes: The second D2D device sends the second message to the network device on a time-frequency resource corresponding to the location of the time-frequency resource obtained through contention.

Specifically, step A includes:

Step A1. The second D2D device sets a timer for contending for the time-frequency resource in the feedback resource pool, where a timing value of the timer is a value of a monotonically decreasing function in which an independent variable represents the coverage ratio.

Step A2. The second D2D device starts timing simultaneously with the another D2D device, and contends for the location of the time-frequency resource in the feedback resource pool, where the another D2D device also sets the timer.

Step A3. When the timer set by the second D2D device first expires, the second D2D device obtains through contention the time-frequency resource in the feedback resource pool.

After correctly decoding a sent message from the first D2D device, and at the arrival of the resource pool, the second D2D devices respectively start feedback timers. Once being started, the timers count down at a same speed. Once the timers return to zero, a message is sent on a resource obtained through contention from the resource pool, and values of the timers are set to −1. Herein, the second D2D devices set values of their respective feedback timers to f(coverage ratio), where the f( ) function is required to be a monotonically decreasing function. Therefore, a feedback timer corresponding to a second D2D device with a largest coverage ratio has a smallest value, and the second D2D device can first preempt a resource in the resource pool, and broadcast the corresponding coverage ratio and an identifier of the first D2D device. Before the timers return to zero, all the second D2D devices are in a listening state in the resource pool. Once finding that a second D2D device has preempted a resource, the other second D2D devices attempt to parse out the identifier of the first D2D device from a sent message. If the identifier of the first D2D device included in the message is the same as an identifier of the first D2D device obtained from the previously received message, the other second D2D devices set values of timers to −1 and give up feedback. The second D2D device with a largest coverage ratio is a receiving device with strongest actual coverage performance. The network device obtains the largest coverage ratio, and can generate a power adjustment indication message according to the largest coverage ratio. In this way, another D2D device does not need to feed back information about a coverage ratio any more, thereby reducing signaling overheads.

The network device performs listening in the entire resource pool, and therefore can also obtain coverage capability information fed back by the second D2D device, including a coverage ratio fed back by the second D2D device and information about an identifier of a corresponding first D2D device. The network device can determine, according to the information, how to adjust a transmit power of the first D2D device, and generate a power control indication message. For example, when the coverage ratio fed back by the second D2D device is greater than 1, it may be considered that the transmit power set for the first D2D device is high and should be decreased appropriately. When the coverage ratio fed back by the second D2D device is less than 1, it may be considered that the transmit power set for the first D2D device is low and should be increased appropriately. When the coverage ratio fed back by the second D2D device is equal to 1, it may be considered that the transmit power set for the first D2D device is appropriate and requires no adjustment. The power control indication message includes N bits, where N is a positive integer, and $2^N$ cases can be indicated. For example, when N=3, eight cases can be indicated, such as −4, −3, −2, −1, 1, 2, 3, and 4, where a value represents a power adjustment value in dB.

According to the power control method provided in this embodiment of the present invention, a second user direct connection communication device sends, to a network device, a coverage ratio of actual coverage performance of a first user direct connection communication device relative to the second user direct connection communication device to expected coverage performance of the first user direct connection communication device; the network device generates a power adjustment indication message according to the coverage ratio and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance. In addition, the network device additionally sets a time-frequency resource pool, and multiple second user direct connection communication devices contend for a time-frequency resource, so as to send a second message on a time-frequency resource obtained through contention. Moreover, timers are set, so that when learning, through listening, that a second user direct connection communication device has preempted a time-frequency resource, all other second user direct connection communication devices may give up feeding back the second message, thereby reducing signaling overheads.

Figure 6:
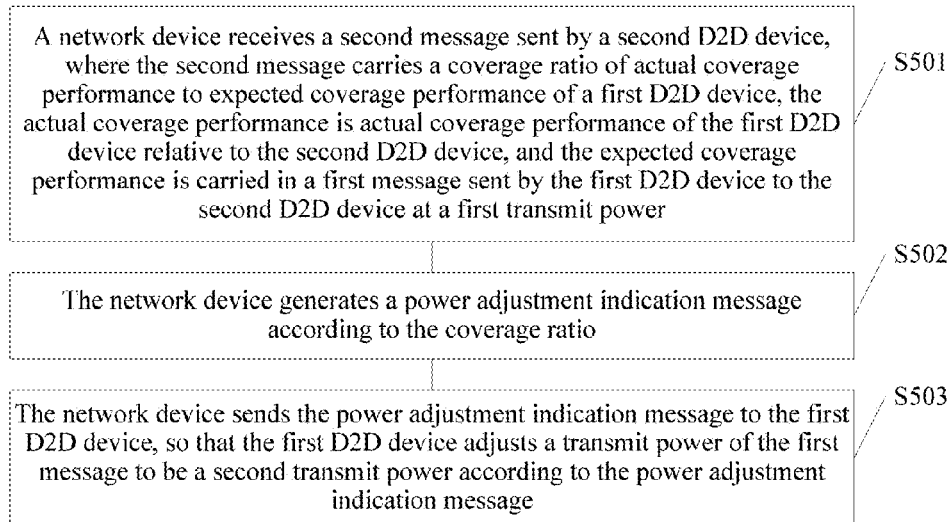
FIG. 6 is a schematic flowchart of still another power control method according to an embodiment of the present invention.

Referring to FIG. 6, FIG. 6 is a schematic flowchart of still another power control method according to an embodiment of the present invention. The method includes the following steps.

Step S501. A network device receives a second message sent by a second D2D device, where the second message carries a coverage ratio of actual coverage performance to expected coverage performance of a first D2D device, the actual coverage performance is actual coverage performance of the first D2D device relative to the second D2D device, and the expected coverage performance is carried in a first message sent by the first D2D device to the second D2D device at a first transmit power.

The second D2D device receives the first message sent by the first D2D device at the first transmit power. The first message includes the expected coverage performance of the first D2D device. Herein, the expected coverage performance includes any one of an expected coverage distance, an expected receive level, or an expected receive signal to interference plus noise ratio. After receiving the first message, the second D2D device parses the first message, to obtain the actual coverage performance of the first D2D device relative to the second D2D device. The actual coverage performance may similarly include any one of an actual coverage distance, an actual receive level, or an actual receive signal to interference plus noise ratio. A parameter, that is, a coverage ratio, is defined herein. The coverage ratio is defined as a ratio of actual coverage performance of the second D2D device to expected coverage performance. Whether coverage of the first message matches an expectation can be obtained according to the coverage ratio. Whether the coverage of the first message matches the expectation can be simply reflected with less message content by defining the coverage ratio.

Optionally, the second message further includes an identifier of the first D2D device.

The second D2D device sends the second message to the network device, where the second message carries the coverage ratio.

Optionally, before step S501, the network device sends a time-frequency resource indication message to the second D2D device, where the time-frequency resource indication message includes information about a location of a time-frequency resource, so that the second D2D device sends the second message to the network device on a time-frequency resource corresponding to the location of the time-frequency resource.

Optionally, in a scenario in which the first D2D device broadcasts the first message to multiple second D2D devices, the network device sets a feedback resource pool for the multiple second D2D devices. The feedback resource pool includes a location or locations of one or more time-frequency resources. Step S501 specifically includes: The network device receives a second message sent on a time-frequency resource obtained through contention by a second D2D device that obtains through contention a location of the time-frequency resource in the feedback resource pool among the multiple second D2D devices.

Step S502. The network device generates a power adjustment indication message according to the coverage ratio.

The network device generates the power adjustment indication message for the first D2D device according to the received coverage ratio. Specifically, when the coverage ratio fed back by the second D2D device is greater than 1, the network device may consider that the first transmit power set for the first D2D device is high and should be decreased appropriately. When the coverage ratio fed back by the second D2D device is less than 1, the network device may consider that the first transmit power set for the first D2D device is low and should be increased appropriately. When the coverage ratio fed back by the second D2D device is equal to 1, the network device may consider that the transmit power set for the first D2D device is appropriate and requires no adjustment. The network device includes these conclusions in the power adjustment indication message.

The power adjustment indication message may include a transmit power adjustment step, or may include a specific transmit power value. The power adjustment indication message includes information indicating the transmit power adjustment step. The information indicating the transmit power adjustment step may be specifically N bits, where N is a positive integer, and $2^N$ cases can be indicated. For example, when N=3, eight cases can be indicated, such as −4, −3, −2, −1, 1, 2, 3, and 4, where a value represents a transmit power adjustment step value in unit of dB.

Step S503. The network device sends the power adjustment indication message to the first D2D device, so that the first D2D device adjusts a transmit power of the first message to be a second transmit power according to the power adjustment indication message.

The network device sends the power adjustment indication message to the first D2D device. The first D2D device adjusts the transmit power of the first message to be the second transmit power according to the power adjustment indication message sent by the network device. Adjustment control is performed on the transmit power according to the actual coverage performance, and therefore, the actual coverage performance of the first D2D device can match the expected coverage performance.

According to the power control method provided in this embodiment of the present invention, a network device generates a power adjustment indication message according to a coverage ratio of actual coverage performance of a first user direct connection communication device relative to a second user direct connection communication device to expected coverage performance of the first user direct connection communication device, and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance.

Figure 7:
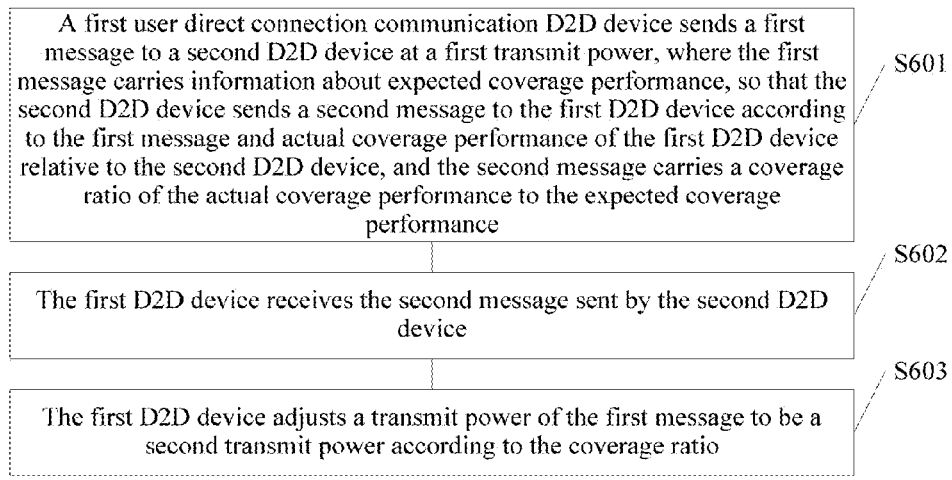
FIG. 7 is a schematic flowchart of still another power control method according to an embodiment of the present invention.
Figure 8:
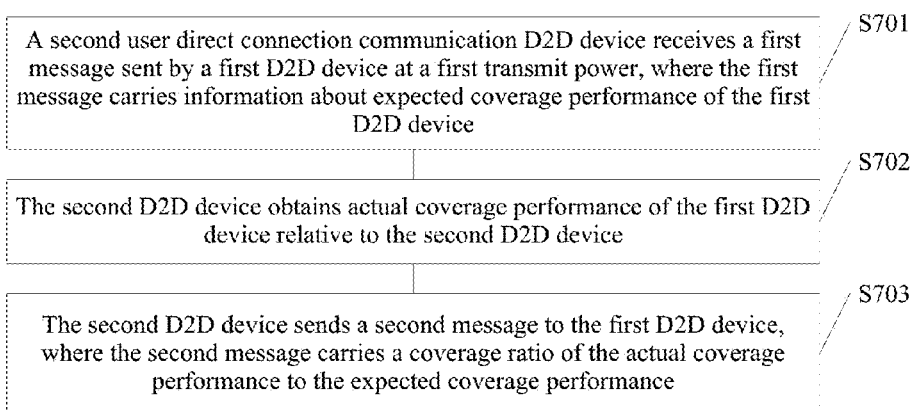
FIG. 8 is a schematic flowchart of still another power control method according to an embodiment of the present invention.

Referring to FIG. 7 and FIG. 8 in the following, another set of power control methods according to the present invention are described in detail in embodiments.

Referring to FIG. 7, FIG. 7 is a schematic flowchart of still another power control method according to an embodiment of the present invention. The method includes the following steps.

Step S601. A first user direct connection communication D2D device sends a first message to a second D2D device at a first transmit power, where the first message carries information about expected coverage performance, so that the second D2D device sends a second message to the first D2D device according to the first message and actual coverage performance of the first D2D device relative to the second D2D device, and the second message carries a coverage ratio of the actual coverage performance to the expected coverage performance.

Optionally, before step S601, the first D2D device receives a time-frequency resource indication indicated to the first D2D device by a network device. The time-frequency resource indication message includes information about a location of a time-frequency resource. Step S601 specifically includes: The first D2D device sends the first message to the second D2D device at the first transmit power on a time-frequency resource corresponding to the location of the time-frequency resource.

The actual coverage performance includes any one of an actual coverage distance, an actual receive level, or an actual receive signal to interference plus noise ratio. The expected coverage performance includes any one of an expected coverage distance, an expected receive level, or an expected receive signal to interference plus noise ratio.

Step S602. The first D2D device receives the second message sent by the second D2D device.

Optionally, the second message may be sent to the first D2D device by the second D2D device on a time-frequency resource indicated to the second D2D device by the network device.

Optionally, in a scenario in which the first D2D device broadcasts the first message to multiple second D2D devices, the second message may be sent by a second D2D device to the first D2D device on a time-frequency resource obtained through contention in a feedback resource pool of the network device, where the second D2D device first obtains through contention the time-frequency resource among the multiple second D2D devices contending for a time-frequency resource in the feedback resource pool.

Step S603. The first D2D device adjusts a transmit power of the first message to be a second transmit power according to the coverage ratio.

This step specifically includes the following steps.

Step B1. The first D2D device determines a transmit power adjustment step according to the coverage ratio.

Step B2. The first D2D device obtains the second transmit power according to the transmit power adjustment step, and sends the first message at the second transmit power, where the second transmit power is a smaller power value between a maximum rated transmit power of the first D2D device and a sum of the first transmit power and the transmit power adjustment step.

In this embodiment, the second D2D device includes the coverage ratio in the second message. The second D2D device sends the second message to the first D2D device. The first D2D device receives the second message sent by the second D2D device and adjusts the transmit power of the first message according to the coverage ratio in the second message. For other implementation processes, for example, processes of sending the first message and the second message, a process of obtaining the coverage ratio, and a process of adjusting the transmit power, refer to the first set of embodiments.

According to the power control method provided in this embodiment of the present invention, a second user direct connection communication device obtains a coverage ratio of actual coverage performance of a first user direct connection communication device relative to the second user direct connection communication device to expected coverage performance of the first user direct connection communication device, and feeds back the coverage ratio to the first user direct connection communication device; and the first user direct connection communication device adjusts a transmit power of a first message according to the coverage ratio, so that the first user direct connection communication device can appropriately set its transmit power, to make the actual coverage performance of the first user direct connection communication device match the expected coverage performance.

Referring to FIG. 8, FIG. 8 is a schematic flowchart of still another power control method according to an embodiment of the present invention. The method includes the following steps.

Step S701. A second user direct connection communication D2D device receives a first message sent by a first D2D device at a first transmit power, where the first message carries information about expected coverage performance of the first D2D device.

Step S702. The second D2D device obtains actual coverage performance of the first D2D device relative to the second D2D device.

Step S703. The second D2D device sends a second message to the first D2D device, where the second message carries a coverage ratio of the actual coverage performance to the expected coverage performance.

Optionally, before this step, the method may further include step C: The second D2D device obtains a time-frequency resource indication message sent by a network device, where the time-frequency resource indication message includes information about a location of a time-frequency resource on which the second message is sent. Therefore, step S703 is specifically step D: The second D2D device sends the second message to the first D2D device on a time-frequency resource corresponding to the location of the time-frequency resource.

Optionally, in a scenario in which another D2D device also receives the first message sent by the first D2D device, the time-frequency resource indication message includes a feedback resource pool set by the network device for the second D2D device and the another D2D device. The feedback resource pool includes a location of at least one time-frequency resource.

The method further includes step E: The second D2D device contends with the another D2D device for the location of the time-frequency resource in the feedback resource pool, where the information about the location of the time-frequency resource on which the second message is sent is information about a location of at least one time-frequency resource on which the second message is sent, and the location of the time-frequency resource on which the second message is sent constitutes the feedback resource pool.

Therefore, step D is specifically: The second D2D device sends the second message to the first D2D device on a time-frequency resource corresponding to the location of the time-frequency resource obtained through contention.

Specifically, step E further includes the following steps:

Step E1: The second D2D device sets a timer for contending for the time-frequency resource in the feedback resource pool, where a timing value of the timer is a value of a monotonically decreasing function in which an independent variable represents the coverage ratio.

Step E2. The second D2D device starts timing simultaneously with the another D2D device, and contends for the location of the time-frequency resource in the feedback resource pool, where the another D2D device also sets the timer.

Step E3. When the timer set by the second D2D device first expires, the second D2D device obtains through contention the time-frequency resource in the feedback resource pool.

In this embodiment, the second D2D device includes the coverage ratio in the second message. The second D2D device sends the second message to the first D2D device. The first D2D device receives the second message sent by the second D2D device and adjusts the transmit power of the first message according to the coverage ratio in the second message. For other implementation processes, for example, processes of sending the first message and the second message, a process of obtaining the coverage ratio, and a process of adjusting the transmit power, refer to the first set of embodiments.

According to the power control method provided in this embodiment of the present invention, a second user direct connection communication device obtains a coverage ratio of actual coverage performance of a first user direct connection communication device relative to the second user direct connection communication device to expected coverage performance of the first user direct connection communication device, and feeds back the coverage ratio to the first user direct connection communication device; and the first user direct connection communication device adjusts a transmit power of a first message according to the coverage ratio, so that the first user direct connection communication device can appropriately set its transmit power, to make the actual coverage performance of the first user direct connection communication device match the expected coverage performance.

To implement the foregoing method embodiments of the present invention in FIG. 2 to FIG. 8, a first D2D device, a second D2D device, and a network device are further provided.

Figure 9:
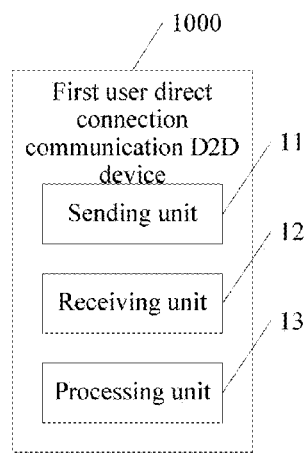
FIG. 9 is a schematic structural diagram of a first user direct connection communication D2D device according to an embodiment of the present invention.
Figure 10:
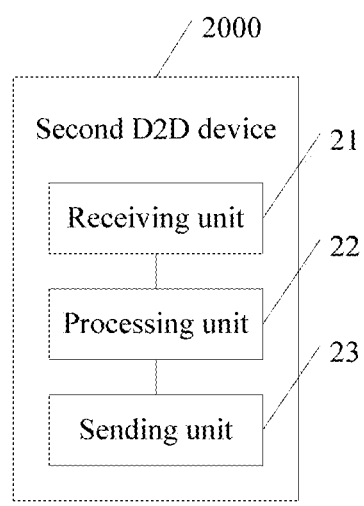
FIG. 10 is a schematic structural diagram of a second D2D device according to an embodiment of the present invention.
Figure 11:
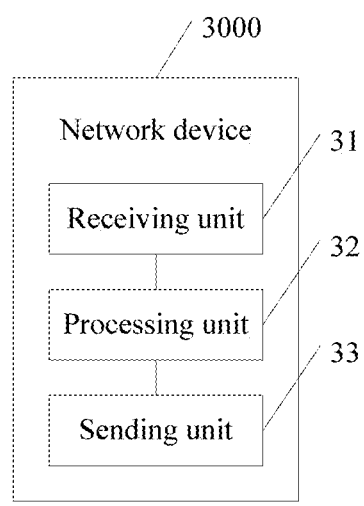
FIG. 11 is a schematic structural diagram of a network device according to an embodiment of the present invention.

Referring to FIG. 9 to FIG. 11 in the following, devices for the first set of power control solutions provided in the present invention are described in detail in embodiments.

Referring to FIG. 9, FIG. 9 is a schematic structural diagram of a first user direct connection communication D2D device according to an embodiment of the present invention. The first D2D device 1000 includes: a sending unit 11, a receiving unit 12, and a processing unit 13.

The sending unit 11 is configured to send a first message to a second D2D device at a first transmit power, where the first message carries expected coverage performance of the first D2D device, so that the second D2D device sends a second message to a network device according to the first message and actual coverage performance of the first D2D device relative to the second D2D device, where the second message carries a coverage ratio of the actual coverage performance to the expected coverage performance, so that the network device generates a power adjustment indication message according to the coverage ratio and sends the power adjustment indication message to the first D2D device.

The sending unit 11 sends the first message to the second D2D device at the first transmit power. For a first D2D device sending the first message for the first time, the message may be sent at an initial default power (for example, a maximum rated power). The first message includes the expected coverage performance of the first D2D device. Herein, the expected coverage performance includes any one of an expected coverage distance, an expected receive level, or an expected receive signal to interference plus noise ratio.

Optionally, when the expected coverage performance is an expected coverage distance, the first message further includes location information of the first D2D device.

Optionally, the first message further includes an identifier of the first D2D device.

For example, in a D2D broadcast system, after the sending unit 11 sends the first message, all D2D devices (that is, second D2D devices) near the sending unit 11 attempt to decode the message. A second D2D device capable of correctly decoding the message can obtain information about the expected coverage performance of the first D2D device carried in the message. Herein, "sending" is a broadcast action.

After receiving the first message, the second D2D device parses the first message, to obtain the actual coverage performance of the first D2D device relative to the second D2D device. The actual coverage performance may similarly include any one of an actual coverage distance, an actual receive level, or an actual receive signal to interference plus noise ratio. For example, the coverage performance is a coverage distance. Because there may be multiple second D2D devices near the first D2D device, and distances between the multiple second D2D devices and the first D2D device may vary, each second D2D device may obtain an actual coverage distance between the second D2D device and the first D2D device according to location information of the second D2D device and location information of the first D2D device. Similarly, if the expected coverage performance is an expected receive level or an expected receive signal to interference plus noise ratio, the second D2D device may obtain an actual receive level or an actual receive signal to interference plus noise ratio for receiving the first message.

A parameter, that is, a coverage ratio, is defined herein. The coverage ratio is defined as a ratio of actual coverage performance of each second D2D device capable of correctly decoding the first message to expected coverage performance. Whether coverage of the first message matches an expectation can be obtained according to the coverage ratio. Using a coverage distance as an example, a coverage ratio greater than 1 represents that an actual coverage distance is greater than an expected coverage distance; a coverage ratio less than 1 represents that an actual coverage distance is less than an expected coverage distance. Whether the coverage of the first message matches the expectation can be simply and clearly reflected by defining the coverage ratio.

Then, the second D2D device sends the second message to the network device, where the second message carries the coverage ratio. The network device generates the power adjustment indication message for the first D2D device according to the received coverage ratio and sends the power adjustment indication message to the first D2D device. Specifically, when the coverage ratio fed back by the second D2D device is greater than 1, the network device may consider that the first transmit power set for the first D2D device is high and should be decreased appropriately. When the coverage ratio fed back by the second D2D device is less than 1, the network device may consider that the first transmit power set for the first D2D device is low and should be increased appropriately. When the coverage ratio fed back by the second D2D device is equal to 1, the network device may consider that the transmit power set for the first D2D device is appropriate and requires no adjustment. The network device includes these conclusions in the power adjustment indication message and sends the power adjustment indication message to the first D2D device.

Optionally, the second message further includes the identifier of the first D2D device, so that the network device sends the power adjustment indication message to the first D2D device.

The receiving unit 12 is configured to receive the power adjustment indication message sent by the network device.

The power adjustment indication message may include information indicating a transmit power adjustment step, or may include a specific transmit power value.

The processing unit 13 is configured to adjust a transmit power of the first message to be a second transmit power according to the power adjustment indication message.

The processing unit 13 adjusts the transmit power of the first message to be the second transmit power according to the power adjustment indication message sent by the network device. Adjustment control is performed on the transmit power according to the actual coverage performance, and therefore, the actual coverage performance of the first D2D device can match the expected coverage performance.

Still referring to FIG. 9, the first D2D device 1000 provided in this embodiment of the present invention is further described.

The receiving unit 12 is further configured to receive a time-frequency resource indication message indicated to the first D2D device by the network device, where the time-frequency resource indication message includes information about a location of a time-frequency resource.

Because one network device usually manages more than one first D2D device, D2D communication in this embodiment of the present invention may be based on an aid of the network device, and the network device indicates a time-frequency resource to be occupied by the first D2D device, or the first D2D device contends for a time-frequency resource in a time-frequency resource pool of the network device. Specifically, the indication message includes information about a location of the time-frequency resource. This can avoid a transmission failure or interference to the second D2D device resulting from message transmission performed by multiple first D2D devices at a location of a same time-frequency resource.

The sending unit 11 is specifically configured to send a first message to a second D2D device at a first transmit power on a time-frequency resource corresponding to the location of the time-frequency resource. The first message carries information about expected coverage performance of the first D2D device, so that the second D2D device sends a second message to the network device according to the first message and actual coverage performance of the first D2D device relative to the second D2D device. The second message carries a coverage ratio of the actual coverage performance to the expected coverage performance, so that the network device generates a power adjustment indication message according to the coverage ratio and sends the power adjustment indication message to the first D2D device.

Different from the foregoing embodiment, in this embodiment, the sending unit 11 sends the first message on the time-frequency resource corresponding to the location of the time-frequency resource indicated by the network device.

It should be noted that the second message may also be sent by the sending unit 11 to the network device on a time-frequency resource indicated by the network device. Specifically, in a scenario in which the sending unit 11 broadcasts the first message to multiple second D2D devices, the second message may be sent by a second D2D device to the network device on a time-frequency resource obtained through contention in a feedback resource pool of the network device, where the second D2D device first obtains through contention the time-frequency resource among the multiple second D2D devices contending for a time-frequency resource in the feedback resource pool.

The receiving unit 12 is configured to receive the power adjustment indication message sent by the network device.

The sending unit 11 receives, by using an air interface, the power adjustment indication message sent by the network device. The air interface may include: physical layer signaling, Media Access Control layer signaling, or radio resource control signaling. The network device may send the power adjustment indication message to the first D2D device by using the air interface, so that the first D2D device can rapidly obtain the power adjustment indication message.

The power adjustment indication message includes information indicating a transmit power adjustment step. The information indicating a transmit power adjustment step is specifically N bits, where N is a positive integer, and 2^N cases can be indicated. For example, when N=3, eight cases can be indicated, such as −4, −3, −2, −1, 1, 2, 3, and 4, where a value represents a transmit power adjustment step value, and a unit may be dB (dB).

The processing unit is specifically configured to obtain the second transmit power according to the power adjustment indication message, and send the first message at the second transmit power, where the second transmit power is a smaller power value between a maximum rated transmit power of the first D2D device and a sum of the first transmit power and the transmit power adjustment step.

Specifically, after the receiving unit 12 receives the power adjustment indication message from the network device, the processing unit 13 obtains a corresponding transmit power adjustment step value, and obtains the second transmit power according to the following formula:

$$PTX=\min(P\text{max}, PTXo+\text{delta})$$

where PTX is the second transmit power, Pmax is the maximum rated transmit power of the first D2D device, PTXo is the first transmit power, and delta is the transmit power adjustment step value of the first D2D device.

Certainly, the power adjustment indication message may alternatively indicate an exact second transmit power.

According to the first user direct connection communication device provided in this embodiment of the present invention, a network device generates a power adjustment indication message according to a coverage ratio of actual coverage performance of the first user direct connection communication device relative to a second user direct connection communication device to expected coverage performance of the first user direct connection communication device, and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance. In addition, the first user direct connection communication device sends a first message on a time-frequency resource indicated by the network device. This can avoid a transmission failure or interference to receiving of the first message by the second user direct connection communication device caused by a time-frequency resource conflict with another first user direct connection communication device.

Referring to FIG. 10, FIG. 10 is a schematic structural diagram of a second D2D device according to an embodiment of the present invention. The second D2D device includes: a receiving unit 21, a processing unit 22, and a sending unit 23.

The receiving unit 21 is configured to receive a first message sent by a first D2D device at a first transmit power, where the first message carries information about expected coverage performance of the first D2D device.

The receiving unit 21 receives the first message sent by the first D2D device at the first transmit power. The first message includes the expected coverage performance of the first D2D device. Herein, the expected coverage performance includes any one of an expected coverage distance, an expected receive level, or an expected receive signal to interference plus noise ratio.

The processing unit 22 is configured to obtain actual coverage performance of the first D2D device relative to the second D2D device.

After the receiving unit 21 receives the first message, the processing unit 22 parses the first message, to obtain the actual coverage performance of the first D2D device relative to the second D2D device. The actual coverage performance may similarly include any one of an actual coverage distance, an actual receive level, or an actual receive signal to interference plus noise ratio.

Optionally, the first message further includes an identifier of the first D2D device.

For example, the coverage performance is a coverage distance. Because there may be multiple second D2D devices near the first D2D device, and distances between the multiple second D2D devices and the first D2D device may vary, each second D2D device may obtain an actual coverage distance between the second D2D device and the first D2D device according to location information of the second D2D device and current location information of the first D2D device. The first message may further include the current location information of the first D2D device. Similarly, if the expected coverage performance is an expected receive level or an expected receive signal to interference plus noise ratio, the second D2D device may obtain an actual receive level or an actual receive signal to interference plus noise ratio for receiving the first message.

The sending unit 23 is configured to send a second message to a network device, where the second message carries a coverage ratio of the actual coverage performance to the expected coverage performance, so that the network device generates a power adjustment indication message according to the coverage ratio and sends the power adjustment indication message to the first D2D device.

A parameter, that is, a coverage ratio, is defined herein. The coverage ratio is defined as a ratio of actual coverage performance of the second D2D device to expected coverage performance. Whether coverage of the first message matches an expectation can be obtained according to the coverage ratio. Using a coverage distance as an example, a coverage ratio greater than 1 represents that an actual coverage distance is greater than an expected coverage distance; a coverage ratio less than 1 represents that an actual coverage distance is less than an expected coverage distance. Whether the coverage of the first message matches the expectation can be simply and clearly reflected by defining the coverage ratio.

The sending unit 23 sends the second message to the network device, where the second message carries the coverage ratio. The network device generates the power adjustment indication message for the first D2D device according to the received coverage ratio and sends the power adjustment indication message to the first D2D device. The first D2D device adjusts a transmit power of the first message to be a second transmit power according to the power adjustment indication message sent by the network device.

Optionally, the second message further includes the identifier of the first D2D device, so that the network device sends the power adjustment indication message to the first D2D device.

Adjustment control is performed on the transmit power according to the actual coverage performance, and therefore, the actual coverage performance of the first D2D device can match the expected coverage performance.

Still referring to FIG. 10, the second D2D device 2000 provided in this embodiment of the present invention is further described.

The receiving unit 21 is configured to receive a first message sent by the first D2D device at a first transmit power, where the first message carries information about expected coverage performance of the first D2D device.

A function of the receiving unit 21 is the same as that of the receiving unit 21 in the foregoing embodiment. Optionally, the first message may be sent on a time-frequency resource corresponding to a location of a time-frequency resource indicated by the network device.

The processing unit 22 is configured to obtain actual coverage performance of the first D2D device relative to the second D2D device according to the first message.

A function of the processing unit 22 is the same as that of the processing unit 22 in the foregoing embodiment.

For example, the coverage performance is a coverage distance. The second D2D device has a positioning apparatus and can obtain location information of the second D2D device by using a positioning system (for example, a GPS), and the first message may further include a current location of the first D2D device. Therefore, the processing unit 22 can obtain through calculation a distance between the processing unit 22 and the first D2D device according to the current location of the first D2D device and the location information of the processing unit 22 obtained by using the positioning system. There are multiple second D2D devices near the first D2D device, and distances obtained, through calculation, by second D2D devices capable of correctly decoding the message vary from each other. A parameter, that is, a coverage ratio of the message, is defined. The coverage ratio is defined as a ratio of an actual coverage distance of the message to an expected coverage distance of the message. Whether coverage of the message matches an expectation can be obtained according to the coverage ratio. For example, a coverage ratio greater than 1 represents that an actual coverage distance is greater than an expected coverage distance; a coverage ratio less than 1 represents that an actual coverage distance is less than an expected coverage distance.

The receiving unit 21 is further configured to obtain a time-frequency resource indication message sent by the network device, where the time-frequency resource indication message includes information about a location of a time-frequency resource.

The sending unit 23 is configured to send a second message to the network device on a time-frequency resource corresponding to the location of the time-frequency resource, where the second message carries a coverage ratio of the actual coverage performance to the expected coverage performance, so that the network device generates a power adjustment indication message according to the coverage ratio and sends the power adjustment indication message to the first D2D device.

The second D2D device needs to feed back the coverage ratio to the network device. The network device indicates to the second D2D device the location of the time-frequency resource on which the second message carrying the coverage ratio is sent. The second D2D device obtains the time-frequency resource indication message sent by the network device. The indication message includes the location of the time-frequency resource. The second D2D device sends the second message to the network device on the time-frequency resource corresponding to the location of the time-frequency resource, so as to reliably send the second message to the network device.

In a broadcast scenario, another D2D device may also receive the first message sent by the first D2D device. Each second D2D device can obtain a distance between the second D2D device and the first D2D device, but the second D2D device does not know whether the distance between the second D2D device and the first D2D device is the farthest, that is, whether a coverage ratio of the message obtained by the second D2D device through calculation is the largest among all second D2D devices. To reduce signaling overheads and complexity resulting from distance comparison between the second D2D devices, a distributed contention comparison and feedback mechanism is designed in this embodiment of the present invention. The network device sets, for the second D2D device and the another D2D device, a feedback resource pool used for coverage capability feedback of the second D2D device and the another D2D device, and indicates information about the feedback resource pool to the second D2D device by using a time-frequency resource indication message. Therefore, the second D2D device can obtain the information about the resource pool that can be used for coverage capability feedback. A location of a time-frequency resource on which the second message is sent constitutes the feedback resource pool.

Optionally, the processing unit 22 is further configured to contend with the another D2D device for the location of the time-frequency resource in the feedback resource pool.

The sending unit 23 is specifically configured to send the second message to the network device on a time-frequency resource corresponding to the location of the time-frequency resource obtained through contention.

Specifically, that the processing unit 22 performs the step of contending with the another D2D device for the location of the time-frequency resource in the feedback resource pool includes: setting a timer for contending for the time-frequency resource in the feedback resource pool, where a timing value of the timer is a value of a monotonically decreasing function in which an independent variable represents the coverage ratio; starting timing simultaneously with the another D2D device, and contending for the location of the time-frequency resource in the feedback resource pool, where the another D2D device also sets the timer; and when the timer set by the second D2D device first expires, obtaining through contention the time-frequency resource in the feedback resource pool.

After correctly decoding a sent message from the first D2D device, and at the arrival of the resource pool, the second D2D devices respectively start feedback timers. Once being started, the timers count down at a same speed. Once the timers return to zero, a message is sent in the resource pool, and values of the timers are set to −1. Herein, the second D2D devices set values of their respective feedback timers to f(coverage ratio), where the f( ) function is required to be a monotonically decreasing function. Therefore, a feedback timer corresponding to a second D2D device with a largest coverage ratio has a smallest value, and the second D2D device can first preempt a resource in the resource pool, and broadcast the corresponding coverage ratio and an identifier of the first D2D device. Before the timers return to zero, all the second D2D devices are in a listening state in the resource pool. Once finding that a second D2D device has preempted a resource, the other second D2D devices attempt to parse out the identifier of the first D2D device from a sent message. If the identifier of the first D2D device included in the message is the same as an identifier of the first D2D device obtained from the previously received message, the other second D2D devices set values of timers to −1 and give up feedback. The second D2D device with a largest coverage ratio is a receiving device with strongest actual coverage performance. The network device obtains the largest coverage ratio, and can generate a power adjustment indication message according to the largest coverage ratio. In this way, another D2D device does not need to feed back information about a coverage ratio any more, thereby reducing signaling overheads.

The network device performs listening in the entire resource pool, and therefore can also obtain coverage capability information fed back by the second D2D device, including a coverage ratio fed back by the second D2D device and information about an identifier of a corresponding first D2D device. The network device can determine, according to the information, how to adjust a transmit power of the first D2D device, and generate a power control indication message. For example, when the coverage ratio fed back by the second D2D device is greater than 1, it may be considered that the transmit power set for the first D2D device is high and should be decreased appropriately. When the coverage ratio fed back by the second D2D device is less than 1, it may be considered that the transmit power set for the first D2D device is low and should be increased appropriately. When the coverage ratio fed back by the second D2D device is equal to 1, it may be considered that the transmit power set for the first D2D device is appropriate and requires no adjustment. The power control indication message includes N bits, where N is a positive integer, and $2^N$ cases can be indicated. For example, when N=3, eight cases can be indicated, such as −4, −3, −2, −1, 1, 2, 3, and 4, where a value represents a power adjustment value in dB.

According to the second user direct connection communication device provided in this embodiment of the present invention, the second user direct connection communication device sends, to a network device, a coverage ratio of actual coverage performance of a first user direct connection communication device relative to the second user direct connection communication device to expected coverage performance of the first user direct connection communication device; the network device generates a power adjustment indication message according to the coverage ratio and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance. In addition, the network device additionally sets a time-frequency resource pool, and multiple second user direct connection communication devices contend for a time-frequency resource, so as to send a second message on a time-frequency resource obtained through contention. Moreover, timers are set, so that when learning, through listening, that a second user direct connection communication device has preempted a time-frequency resource, all other second user direct connection communication devices may give up feeding back the second message, thereby reducing signaling overheads.

Referring to FIG. 11, FIG. 11 is a schematic structural diagram of a network device according to an embodiment of the present invention. The network device 3000 includes: a receiving unit 31, a processing unit 32, and a sending unit 33.

The receiving unit 31 is configured to receive a second message sent by a second D2D device, where the second message carries a coverage ratio of actual coverage performance to expected coverage performance of a first D2D device, the actual coverage performance is actual coverage performance of the first D2D device relative to the second D2D device, and the expected coverage performance is carried in a first message sent by the first D2D device to the second D2D device at a first transmit power.

The receiving unit 31 receives the first message sent by the first D2D device at the first transmit power. The first message includes the expected coverage performance of the first D2D device. Herein, the expected coverage performance includes any one of an expected coverage distance, an expected receive level, or an expected receive signal to interference plus noise ratio. After receiving the first message, the second D2D device parses the first message, to obtain the actual coverage performance of the first D2D device relative to the second D2D device. The actual coverage performance may similarly include any one of an actual coverage distance, an actual receive level, or an actual receive signal to interference plus noise ratio. A parameter, that is, a coverage ratio, is defined herein. The coverage ratio is defined as a ratio of actual coverage performance of the second D2D device to expected coverage performance. Whether coverage of the first message matches an expectation can be obtained according to the coverage ratio. Whether the coverage of the first message matches the expectation can be simply reflected with less message content by defining the coverage ratio.

Optionally, the second message further includes an identifier of the first D2D device.

The second D2D device sends the second message to the network device, where the second message carries the coverage ratio.

Optionally, the sending unit 33 may further send a time-frequency resource indication message to the second D2D device, where the time-frequency resource indication message includes information about a location of a time-frequency resource, so that the second D2D device sends the second message to the network device on a time-frequency resource corresponding to the location of the time-frequency resource.

Optionally, in a scenario in which the first D2D device broadcasts the first message to multiple second D2D devices, the processing unit 32 is configured to set a feedback resource pool for the multiple second D2D devices. The feedback resource pool includes a location or locations of one or more time-frequency resources. The receiving unit 31 is further configured to receive a second message sent on a time-frequency resource obtained through contention by a second D2D device that obtains through contention a location of the time-frequency resource in the feedback resource pool among the multiple second D2D devices.

The processing unit 32 is configured to generate a power adjustment indication message according to the coverage ratio.

The processing unit 32 generates the power adjustment indication message for the first D2D device according to the received coverage ratio. Specifically, when the coverage ratio fed back by the second D2D device is greater than 1, the network device may consider that the first transmit power set for the first D2D device is high and should be decreased appropriately. When the coverage ratio fed back by the second D2D device is less than 1, the network device may consider that the first transmit power set for the first D2D device is low and should be increased appropriately. When the coverage ratio fed back by the second D2D device is equal to 1, the network device may consider that the transmit power set for the first D2D device is appropriate and requires no adjustment. The network device includes these conclusions in the power adjustment indication message.

The power adjustment indication message may include a transmit power adjustment step, or may include a specific transmit power value. The power adjustment indication message includes information indicating the transmit power adjustment step. The information indicating the transmit power adjustment step may be specifically N bits, where N is a positive integer, and $2^N$ cases can be indicated. For example, when N=3, eight cases can be indicated, such as −4, −3, −2, −1, 1, 2, 3, and 4, where a value represents a transmit power adjustment step value in unit of dB.

The sending unit 33 is configured to send the power adjustment indication message to the first D2D device, so that the first D2D device adjusts a transmit power of the first message to be a second transmit power according to the power adjustment indication message.

The sending unit 33 sends the power adjustment indication message to the first D2D device. The first D2D device adjusts the transmit power of the first message to be the second transmit power according to the power adjustment indication message sent by the network device. Adjustment control is performed on the transmit power according to the actual coverage performance, and therefore, the actual coverage performance of the first D2D device can match the expected coverage performance.

According to the network device provided in this embodiment of the present invention, the network device generates a power adjustment indication message according to a coverage ratio of actual coverage performance of a first user direct connection communication device relative to a second user direct connection communication device to expected coverage performance of the first user direct connection communication device, and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance.

Figure 12:
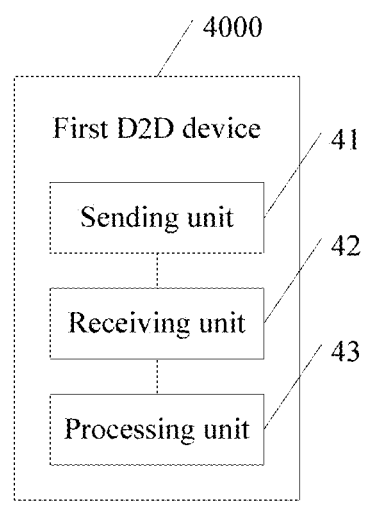
FIG. 12 is a schematic structural diagram of another first D2D device according to an embodiment of the present invention.
Figure 13:
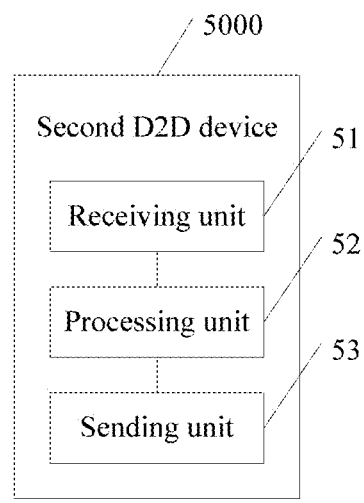
FIG. 13 is a schematic structural diagram of another second D2D device according to an embodiment of the present invention.

Referring to FIG. 12 and FIG. 13 in the following, devices for another set of power control solutions provided in the present invention are described in detail in embodiments.

Referring to FIG. 12, FIG. 12 is a schematic structural diagram of another first D2D device according to an embodiment of the present invention. The first D2D device 4000 includes: a sending unit 41, a receiving unit 42, and a processing unit 43.

The sending unit 41 is configured to send a first message to a second D2D device at a first transmit power, where the first message carries information about expected coverage performance, so that the second D2D device sends a second message to the first D2D device according to the first message and actual coverage performance of the first D2D device relative to the second D2D device, and the second message carries a coverage ratio of the actual coverage performance to the expected coverage performance.

Optionally, the receiving unit 42 is configured to receive a time-frequency resource indication indicated to the first D2D device by a network device. The time-frequency resource indication message includes information about a location of a time-frequency resource. The sending unit 41 is specifically configured to send the first message to the second D2D device at the first transmit power on a time-frequency resource corresponding to the location of the time-frequency resource.

The actual coverage performance includes any one of an actual coverage distance, an actual receive level, or an actual receive signal to interference plus noise ratio. The expected coverage performance includes any one of an expected coverage distance, an expected receive level, or an expected receive signal to interference plus noise ratio.

The receiving unit 42 is configured to receive the second message sent by the second D2D device.

Optionally, the second message may be sent to the first D2D device by the second D2D device on a time-frequency resource indicated to the second D2D device by the network device.

Optionally, in a scenario in which the first D2D device broadcasts the first message to multiple second D2D devices, the second message may be sent by a second D2D device to the first D2D device on a time-frequency resource obtained through contention in a feedback resource pool of the network device, where the second D2D device first obtains through contention the time-frequency resource among the multiple second D2D devices contending for a time-frequency resource in the feedback resource pool.

The processing unit 43 is configured to adjust a transmit power of the first message to be a second transmit power according to the coverage ratio.

That the processing unit 43 performs the step of adjusting a transmit power of the first message to be a second transmit power according to the coverage ratio includes: determining a transmit power adjustment step according to the coverage ratio; and obtaining the second transmit power according to the transmit power adjustment step, and sending the first message at the second transmit power, where the second transmit power is a smaller power value between a maximum rated transmit power of the first D2D device and a sum of the first transmit power and the transmit power adjustment step.

In this embodiment, the second D2D device includes the coverage ratio in the second message. The second D2D device sends the second message to the first D2D device. The first D2D device receives the second message sent by the second D2D device and adjusts the transmit power of the first message according to the coverage ratio in the second message. For other implementation processes, for example, processes of sending the first message and the second message, a process of obtaining the coverage ratio, and a process of adjusting the transmit power, refer to the first set of embodiments.

According to the first D2D device provided in this embodiment of the present invention, a second user direct connection communication device obtains a coverage ratio of actual coverage performance of the first user direct connection communication device relative to the second user direct connection communication device to expected coverage performance of the first user direct connection communication device, and feeds back the coverage ratio to the first user direct connection communication device; and the first user direct connection communication device adjusts a transmit power of a first message according to the coverage ratio, so that the first user direct connection communication device can appropriately set its transmit power, to make the actual coverage performance of the first user direct connection communication device match the expected coverage performance.

Referring to FIG. 13, FIG. 13 is a schematic structural diagram of another second D2D device according to an embodiment of the present invention. The second D2D device 5000 includes: a receiving unit 51, configured to receive a first message sent by a first D2D device at a first transmit power, where the first message carries information about expected coverage performance of the first D2D device; a processing unit 52, configured to obtain actual coverage performance of the first D2D device relative to the second D2D device; and a sending unit 53, configured to send a second message to the first D2D device, where the second message carries a coverage ratio of the actual coverage performance to the expected coverage performance.

Optionally, the processing unit 52 is further configured to obtain a time-frequency resource indication message sent by a network device, where the time-frequency resource indication message includes information about a location of a time-frequency resource on which the second message is sent. The sending unit 53 is specifically configured to send the second message to the first D2D device on a time-frequency resource corresponding to the location of the time-frequency resource.

Optionally, in a scenario in which another D2D device also receives the first message sent by the first D2D device, the time-frequency resource indication message includes a feedback resource pool set by the network device for the second D2D device and the another D2D device. The feedback resource pool includes a location of at least one time-frequency resource.

The processing unit 52 is further configured to contend with the another D2D device for the location of the time-frequency resource in the feedback resource pool, where the information about the location of the time-frequency resource on which the second message is sent is information about a location of at least one time-frequency resource on which the second message is sent, and the location of the time-frequency resource on which the second message is sent constitutes the feedback resource pool.

The sending unit 53 is specifically configured to send the second message to the first D2D device on a time-frequency resource corresponding to the location of the time-frequency resource obtained through contention.

Specifically, that the processing unit 52 performs the step of contending with the another D2D device for the location of the time-frequency resource in the feedback resource pool includes: setting a timer for contending for the time-frequency resource in the feedback resource pool, where a timing value of the timer is a value of a monotonically decreasing function in which an independent variable represents the coverage ratio; starting timing simultaneously with the another D2D device, and contending for the location of the time-frequency resource in the feedback resource pool, where the another D2D device also sets the timer; and when the timer set by the second D2D device first expires, obtaining, by the second D2D device through contention, the time-frequency resource in the feedback resource pool.

In this embodiment, the second D2D device includes the coverage ratio in the second message. The second D2D device sends the second message to the first D2D device. The first D2D device receives the second message sent by the second D2D device and adjusts the transmit power of the first message according to the coverage ratio in the second message. For other implementation processes, for example, processes of sending the first message and the second message, a process of obtaining the coverage ratio, and a process of adjusting the transmit power, refer to the first set of embodiments.

According to the second user direct connection communication device provided in this embodiment of the present invention, the second user direct connection communication device obtains a coverage ratio of actual coverage performance of a first user direct connection communication device relative to the second user direct connection communication device to expected coverage performance of the first user direct connection communication device, and feeds back the coverage ratio to the first user direct connection communication device; and the first user direct connection communication device adjusts a transmit power of a first message according to the coverage ratio, so that the first user direct connection communication device can appropriately set its transmit power, to make the actual coverage performance of the first user direct connection communication device match the expected coverage performance.

Figure 14:
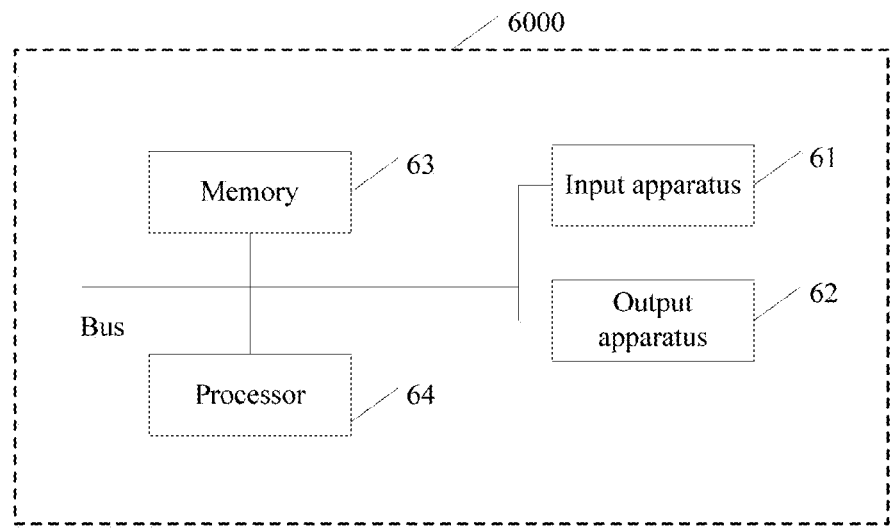
FIG. 14 is a schematic structural diagram of still another first user direct connection communication device according to an embodiment of the present invention.

Referring to FIG. 14, FIG. 14 is a schematic structural diagram of still another first user direct connection communication device according to an embodiment of the present invention. As shown in FIG. 14, the first D2D device 6000 may include: an input apparatus 61, an output apparatus 62, a memory 63, and a processor 64 (there may be one or more processors 64 in the first D2D device, and in FIG. 14, one processor is used as an example). In some embodiments of the present invention, the input apparatus 61, the output apparatus 62, the memory 63, and the processor 64 may be connected by using a bus or in another manner. In FIG. 14, bus connection is used as an example.

When the first D2D device 6000 is running, the processor 64 may perform a method process in the method embodiment corresponding to any one of FIG. 2, FIG. 3, or FIG. 7.

According to the first user direct connection communication device in this embodiment of the present invention, a network device generates a power adjustment indication message according to a coverage ratio of actual coverage performance of the first user direct connection communication device relative to a second user direct connection communication device to expected coverage performance of the first user direct connection communication device, and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance. In addition, the first user direct connection communication device sends a first message on a time-frequency resource indicated by the network device. This can avoid a transmission failure or interference to receiving of the first message by the second user direct connection communication device caused by a time-frequency resource conflict with another first user direct connection communication device.

Figure 15:
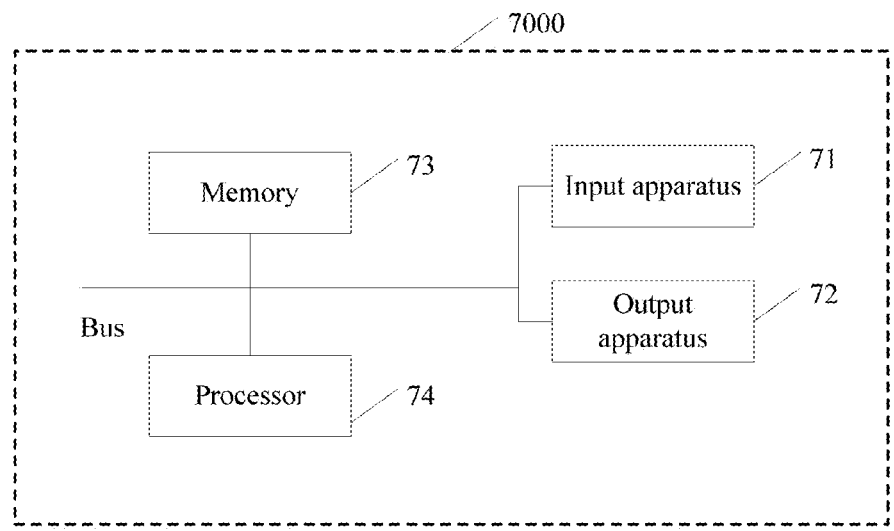
FIG. 15 is a schematic structural diagram of still another second D2D device according to an embodiment of the present invention.

Referring to FIG. 15, FIG. 15 is a schematic structural diagram of still another second D2D device according to an embodiment of the present invention. As shown in FIG. 15, the second D2D device 7000 may include: an input apparatus 71, an output apparatus 72, a memory 73, and a processor 74 (there may be one or more processors 74 in the second D2D device, and in FIG. 15, one processor is used as an example). In some embodiments of the present invention, the input apparatus 71, the output apparatus 72, the memory 73, and the processor 74 may be connected by using a bus or in another manner. In FIG. 15, bus connection is used as an example.

When the second D2D device 7000 is running, the processor 74 may perform a method process in the method embodiment corresponding to any one of FIG. 4, FIG. 5, or FIG. 8.

According to the second user direct connection communication device provided in this embodiment of the present invention, the second user direct connection communication device sends, to a network device, a coverage ratio of actual coverage performance of a first user direct connection communication device relative to the second user direct connection communication device to expected coverage performance of the first user direct connection communication device; the network device generates a power adjustment indication message according to the coverage ratio and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance. In addition, the network device additionally sets a time-frequency resource pool, and multiple second user direct connection communication devices contend for a time-frequency resource, so as to send a second message on a time-frequency resource obtained through contention. Moreover, timers are set, so that when learning, through listening, that a second user direct connection communication device has preempted a time-frequency resource, all other second user direct connection communication devices may give up feeding back the second message, thereby reducing signaling overheads.

Figure 16:
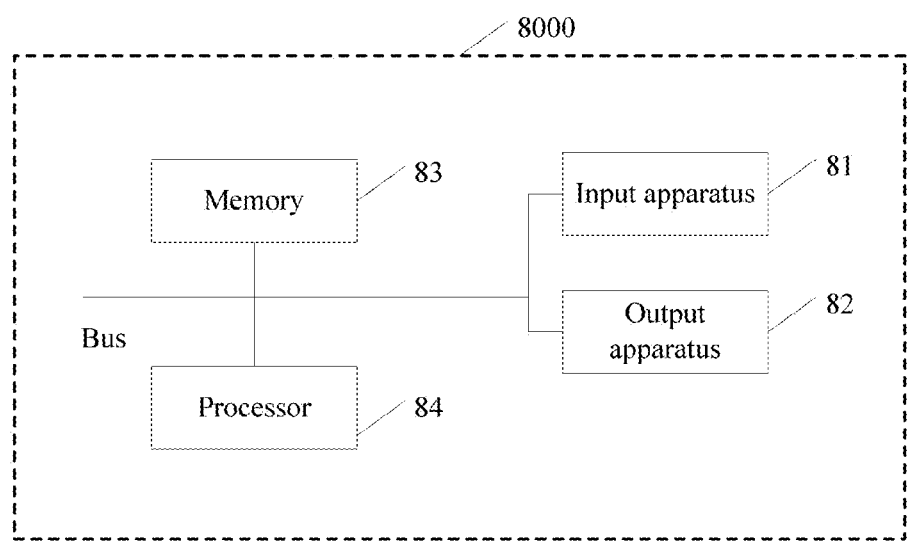
FIG. 16 is a schematic structural diagram of another network device according to an embodiment of the present invention.

Referring to FIG. 16, FIG. 16 is a schematic structural diagram of another network device according to an embodiment of the present invention. As shown in FIG. 16, the network device 8000 may include: an input apparatus 81, an output apparatus 82, a memory 83, and a processor 84 (there may be one or more processors 84 in the network device, and in FIG. 16, one processor is used as an example). In some embodiments of the present invention, the input apparatus 81, the output apparatus 82, the memory 83, and the processor 84 may be connected by using a bus or in another manner. In FIG. 16, bus connection is used as an example.

When the network device 8000 is running, the processor 84 may perform a method process in the method embodiment corresponding to FIG. 6.

According to the network device provided in this embodiment of the present invention, the network device generates a power adjustment indication message according to a coverage ratio of actual coverage performance of a first user direct connection communication device relative to a second user direct connection communication device to expected coverage performance of the first user direct connection communication device, and sends the power adjustment indication message to the first user direct connection communication device; and the first user direct connection communication device controls transmit power according to the power adjustment indication message, so that the first user direct connection communication device can appropriately set its transmit power, to make the actual coverage performance of the first user direct connection communication device match the expected coverage performance.

It should be noted that, for brief description, the foregoing method embodiments are represented as a series of actions. However, a person skilled in the art should appreciate that the present invention is not limited to the described order of the actions, because according to the present invention, some steps may be performed in other orders or simultaneously. In addition, a person skilled in the art should also appreciate that all the embodiments described in the specification are examples of embodiments, and the related actions and modules are not necessarily mandatory to the present invention.

In the foregoing embodiments, the description of each embodiment has respective focuses. For a part that is not described in detail in an embodiment, reference may be made to related descriptions in other embodiments.

A sequence of the steps of the method in the embodiments of the present invention may be adjusted, and certain steps may also be merged or removed according to an actual need.

Merging, division, and removing may be performed on the units in the embodiments of the present invention according to an actual need. A person skilled in the art may combine different embodiments and features of different embodiments described in this specification.

With descriptions of the foregoing embodiments, a person skilled in the art may clearly understand that the present invention may be implemented by hardware, firmware or a combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following is taken as an example but is not limited: The computer readable medium may include a random access memory (RAM), a read-only memory (ROM), an electrically erasable programmable read-only memory (EEPROM), a compact disc read-only memory (CD-ROM) or other optical disk storage, a disk storage medium or other disk storage, or any other medium that can be used to carry or store expected program code in a command or data structure form and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in definition of a medium to which they belong. For example, a disk and disc used by the present invention includes a compact disc (CD), a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

In conclusion, the foregoing descriptions are merely examples of embodiments of the technical solutions of the present invention, but are not intended to limit the protection scope of the present invention. Any modification, equivalent replacement, or improvement made without departing from the spirit and principle of the present invention shall fall within the protection scope of the present invention.

What is claimed is:

1. A method, comprising:
    sending, by a first device to device (D2D) device, a first message to a second D2D device at a first transmit power, wherein the first message carries information about expected coverage performance of the first D2D device;
    receiving, by the first D2D device, a second message sent by the second D2D device, wherein the second message carries a coverage ratio of actual coverage performance of the first D2D device relative to the second D2D device, to the expected coverage performance; and
    adjusting, by the first D2D device, a transmit power of the first message to be a second transmit power according to the coverage ratio.

2. The method according to claim 1, wherein the expected coverage performance is an expected coverage distance, and the first message further comprises location information of the first D2D device.

3. The method according to claim 1, wherein the second message is sent by the second D2D device to the first D2D device on a time-frequency resource indicated to the second D2D device by a network device.

4. The method according to claim 3, wherein the first D2D device broadcasts the first message to a plurality of second D2D devices, and the second message is sent by the second D2D device to the network device on a time-frequency resource obtained through contention in a feedback resource pool of the network device, wherein the second D2D device first obtains through contention the time-frequency resource among the plurality of second D2D devices contending for a time-frequency resource in the feedback resource pool.

5. The method according to claim 3, wherein before sending, by the first D2D device, the first message to the second D2D device at the first transmit power, the method further comprises:
    receiving, by the first D2D device, a time-frequency resource indication message indicated to the first D2D device by the network device, wherein the time-frequency resource indication message comprises information about a location of a time-frequency resource; and
    wherein sending, by the first D2D device, the first message to the second D2D device at the first transmit power comprises:
    sending, by the first D2D device, the first message to the second D2D device at the first transmit power on a time-frequency resource corresponding to the location of the time-frequency resource.

6. The method according to claim 1, wherein adjusting, by the first D2D device, the transmit power of the first message to be the second transmit power according to the coverage ratio comprises:
    determining, by the first D2D device, a transmit power adjustment step according to the coverage ratio; and
    obtaining, by the first D2D device, the second transmit power according to the transmit power adjustment step, and sending the first message at the second transmit power, wherein the second transmit power is a smaller power value between a maximum rated transmit power of the first D2D device and a sum of the first transmit power and the transmit power adjustment step.

7. A method, comprising:
    receiving, by a second device to device (D2D) device, a first message sent by a first D2D device at a first transmit power, wherein the first message carries information about expected coverage performance of the first D2D device;
    obtaining, by the second D2D device, actual coverage performance of the first D2D device relative to the second D2D device; and
    sending, by the second D2D device, a second message to the first D2D device, wherein the second message carries a coverage ratio of the actual coverage performance to the expected coverage performance.

8. The method according to claim 7, wherein the expected coverage performance is an expected coverage distance, and the first message further comprises location information of the first D2D device.

9. The method according to claim 7, wherein before sending, by the second D2D device, the second message to the first D2D device, the method further comprises:
   obtaining, by the second D2D device, a time-frequency resource indication message sent by a network device, wherein the time-frequency resource indication message comprises information about a location of a time-frequency resource on which the second message is sent; and
   wherein sending, by the second D2D device, the second message to the first D2D device comprises:
   sending, by the second D2D device, the second message to the first D2D device on the time-frequency resource corresponding to the location of the time-frequency resource.

10. The method according to claim 9, wherein another D2D device also receives the first message sent by the first D2D device, the information about the location of the time-frequency resource on which the second message is sent is information about a location of a time-frequency resource on which the second message is sent, and the location of the time-frequency resource on which the second message is sent constitutes a feedback resource pool;
   wherein the method further comprises:
      contending, by the second D2D device, with the another D2D device for the location of the time-frequency resource in the feedback resource pool; and
   wherein sending, by the second D2D device, the second message to the first D2D device comprises:
      sending, by the second D2D device, the second message to the first D2D device on a time-frequency resource corresponding to the location of the time-frequency resource obtained through contention.

11. The method according to claim 10, wherein contending, by the second D2D device, with the another D2D device for the location of the time-frequency resource in the feedback resource pool comprises:
   setting, by the second D2D device, a timer for contending for the time-frequency resource in the feedback resource pool, wherein a timing value of the timer is a value of a monotonically decreasing function in which an independent variable represents the coverage ratio;
   starting, by the second D2D device, timing simultaneously with the another D2D device, and contending for the location of the time-frequency resource in the feedback resource pool, wherein the another D2D device also sets the timer; and
   when the timer set by the second D2D device first expires, obtaining, by the second D2D device through contention, the time-frequency resource in the feedback resource pool.

12. A first device to device (D2D) device, comprising:
   a processor; and
   a non-transitory computer-readable storage medium coupled to the processor and storing programming instructions for execution by the processor, wherein the programming instructions instruct the processor to:
      send a first message to a second D2D device at a first transmit power, wherein the first message carries information about expected coverage performance of the first D2D device;
      receive a second message sent by the second D2D device, wherein the second message carries a coverage ratio of actual coverage performance of the first D2D device relative to the second D2D device, to the expected coverage performance; and
      adjust a transmit power of the first message to be a second transmit power according to the coverage ratio.

13. The first D2D device according to claim 12, wherein the expected coverage performance is an expected coverage distance, and the first message further comprises location information of the first D2D device.

14. The first D2D device according to claim 12, wherein the second message is sent by the second D2D device to the first D2D device on a time-frequency resource indicated to the second D2D device by a network device.

15. The first D2D device according to claim 14, wherein the first message is broadcasted to a plurality of second D2D devices, and the second message is sent by the second D2D device to the first D2D device on a time-frequency resource obtained through contention in a feedback resource pool of the network device, wherein the second D2D device first obtains through contention the time-frequency resource among the plurality of second D2D devices contending for a time-frequency resource in the feedback resource pool.

16. The first D2D device according to claim 14, wherein the programming instructions further instruct the processor to:
   receive a time-frequency resource indication message indicated to the first D2D device by the network device, wherein the time-frequency resource indication message comprises information about a location of a time-frequency resource; and
   wherein the programming instructions to send the first message to the second D2D device at the first transmit power comprise instructions to:
      send the first message to the second D2D device at the first transmit power on a time-frequency resource corresponding to the location of the time-frequency resource.

17. A second device to device (D2D) device, comprising:
   a processor; and
   a non-transitory computer-readable storage medium coupled to the processor and storing programming instructions for execution by the processor, wherein the programming instructions instruct the processor to:
      receive a first message sent by a first D2D device at a first transmit power, wherein the first message carries information about expected coverage performance of the first D2D device;
      obtain actual coverage performance of the first D2D device relative to the second D2D device; and
      send a second message to the first D2D device, wherein the second message carries a coverage ratio of the actual coverage performance to the expected coverage performance.

18. The second D2D device according to claim 17, wherein the expected coverage performance is an expected coverage distance, and the first message further comprises location information of the first D2D device.

19. The second D2D device according to claim 17, wherein the programming instructions further comprises instructions to:

obtain a time-frequency resource indication message sent by a network device, wherein the time-frequency resource indication message comprises information about a location of a time-frequency resource on which the second message is sent; and wherein the instructions to send a second message to the first D2D device comprise instructions to:
send the second message to the first D2D device on a time-frequency resource corresponding to the location of the time-frequency resource.

20. The second D2D device according to claim 19, wherein another D2D device also receives the first message sent by the first D2D device, the information about the location of the time-frequency resource on which the second message is sent is information about a location of at least one time-frequency resource on which the second message is sent, and the location of the time-frequency resource on which the second message is sent constitutes a feedback resource pool, and the programming instructions further comprises instructions to:
contend with the another D2D device for the location of the time-frequency resource in the feedback resource pool; and wherein the instructions to send a second message to the first D2D device comprises instructions to:
send the second message to the first D2D device on a time-frequency resource corresponding to the location of the time-frequency resource obtained through contention.

* * * * *